United States Patent
Zink et al.

(10) Patent No.: US 6,830,140 B2
(45) Date of Patent: Dec. 14, 2004

(54) CLUTCH DEVICE CONNECTED CENTRALLY ON THE INPUT SIDE TO A ROTATING SHAFT OR ROTATING COMPONENT IN A MOTOR VEHICLE DRIVE TRAIN

(75) Inventors: Georg Zink, Gerolzhofen (DE); Andreas Orlamünder, Schweinfurt (DE); Olaf Pagels, Bergrheinfeld (DE); Sebastian Vogt, Bad Neustadt (DE); Markus Heiartz, Würzburg (DE)

(73) Assignee: ZF Sachs AG, Schweinfurt (DE)

( * ) Notice: Subject to any disclaimer, the term of this patent is extended or adjusted under 35 U.S.C. 154(b) by 7 days.

(21) Appl. No.: 10/265,939

(22) Filed: Oct. 7, 2002

(65) Prior Publication Data

US 2003/0066730 A1 Apr. 10, 2003

(30) Foreign Application Priority Data

Oct. 9, 2001 (DE) .......................................... 101 49 704

(51) Int. Cl.⁷ .............................................. F16D 21/02
(52) U.S. Cl. .................... 192/48.9; 192/70.16; 192/200; 192/110 B; 192/110 S
(58) Field of Search ............................ 192/48.9, 70.16, 192/200, DIG. 1, 110 R, 110 S; 403/260, 359

(56) References Cited

U.S. PATENT DOCUMENTS

| | | | |
|---|---|---|---|
| 5,279,183 A | 1/1994 | Förster et al. | ................. 74/572 |
| 5,480,016 A * | 1/1996 | Kurz et al. | ............... 192/70.16 |
| 5,524,739 A | 6/1996 | Baier et al. | ............... 192/70.16 |
| 5,799,766 A | 9/1998 | Link et al. | ................ 192/70.16 |
| 5,901,825 A | 5/1999 | Uenohara | ................ 192/70.13 |
| 6,119,549 A * | 9/2000 | Yamamoto | ................... 74/574 |

FOREIGN PATENT DOCUMENTS

| | | | |
|---|---|---|---|
| DE | 689 437 | 3/1940 | |
| FR | 1 328 670 | 5/1963 | ........... F16D/21/06 |

OTHER PUBLICATIONS

Schult–Andres H: "Der Einsatz Von Modulkuppiungen in Zukunftigen Personenkraftwagen the Use of Modular Clutches in Future Passenger Cars" MTZ Motortechnische Zeitschrift, Franckh'Sche Verlagshandlung, Abteilung Technik. Stuttgart, DE, Bd. 55, Nr. 9 Sep. 1994.

* cited by examiner

*Primary Examiner*—Saul Rodriguez
(74) *Attorney, Agent, or Firm*—Cohen, Pontani, Lieberman & Pavane

(57) ABSTRACT

A motor vehicle drive train with a clutch device installed between a drive unit and a transmission having at least one transmission input shaft to transmit torque between the drive unit and the transmission. The clutch device comprises at least one clutch arrangement assigned to a respective transmission input shaft, where an input side of the clutch device is connected directly or indirectly by way of a torque-transmitting arrangement to a connecting end of a power takeoff shaft of the drive unit. The torque-transmitting arrangement has a radially outer connecting area for connection to the clutch device and a radially inner connecting area for the direct or indirect connection to the connecting end by the mediation of at least one positive connecting element, which connects the radially inner connecting area in a positive manner to the connecting end or to a component or assembly attached nonrotatably to the connecting end, and which secures the radially inner connecting area on the connecting end or on the component or assembly in the axial direction. The positive connecting element is located in a central radial area relative to an axis of rotation (A) of the clutch device, which area is essentially the same as or smaller than the radial area occupied by the minimum of one transmission input shaft.

47 Claims, 14 Drawing Sheets

Fig. 7
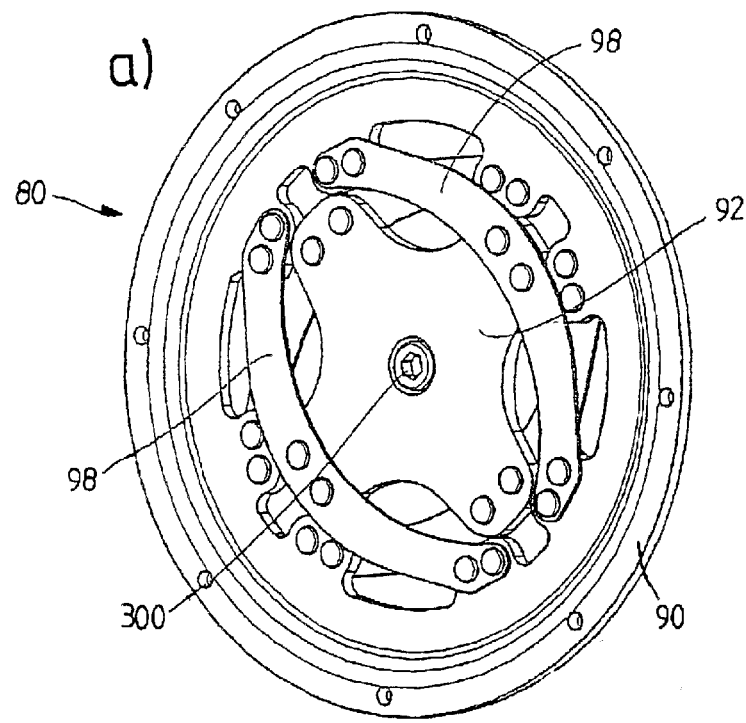
a)
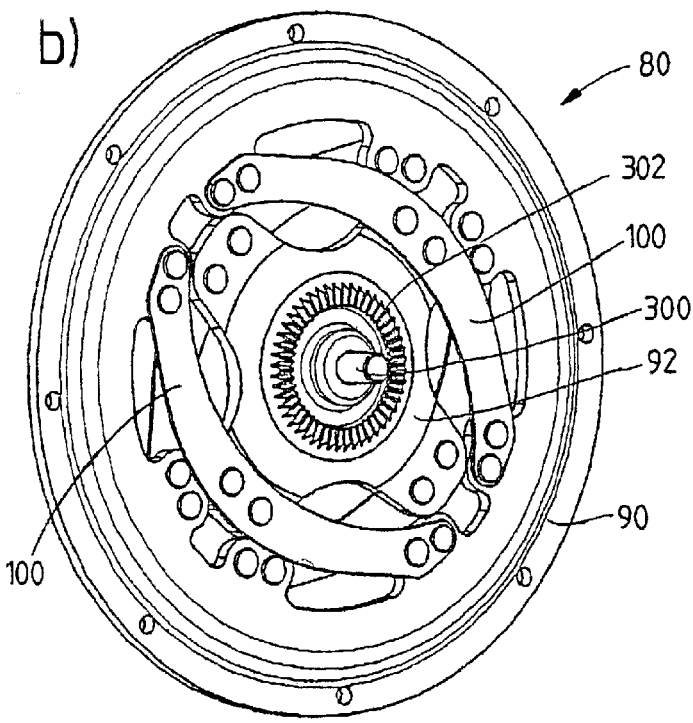
b)

Fig. 9
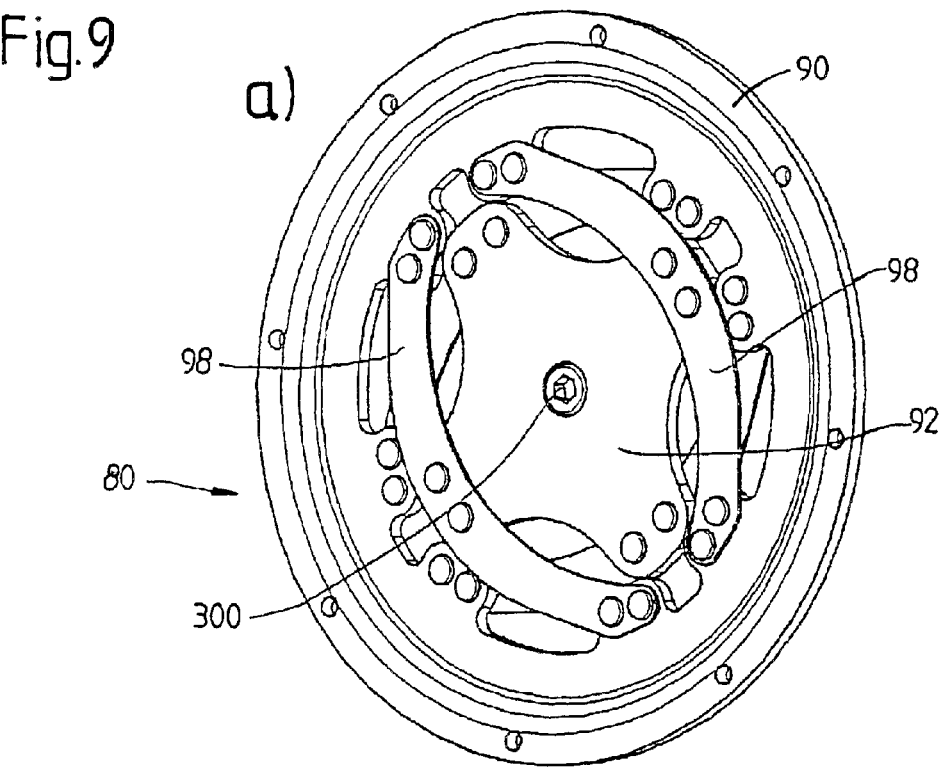
a)
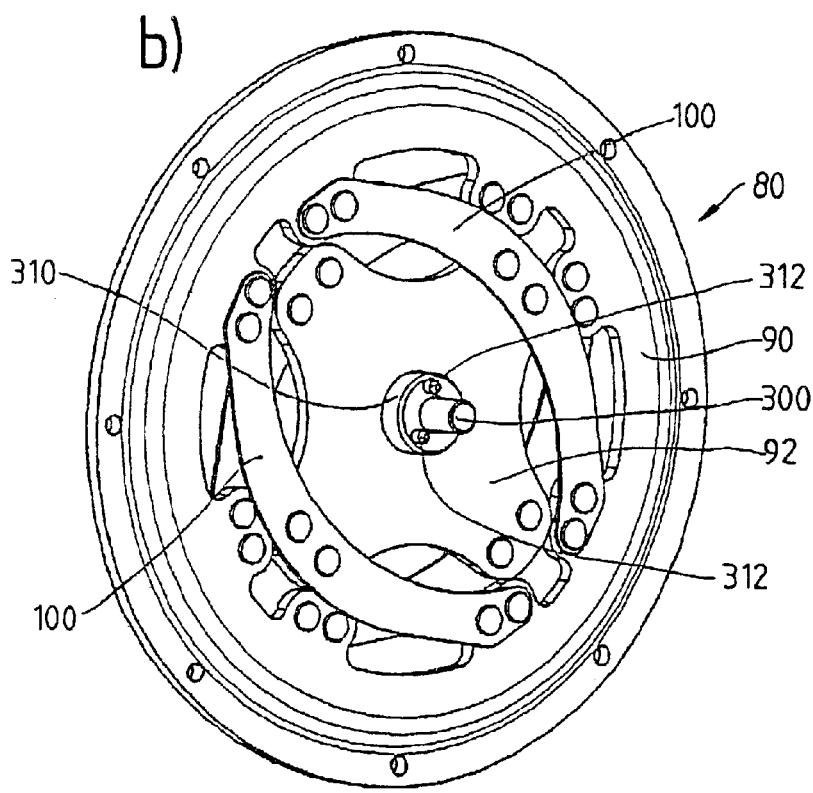
b)

Fig. 11
a)
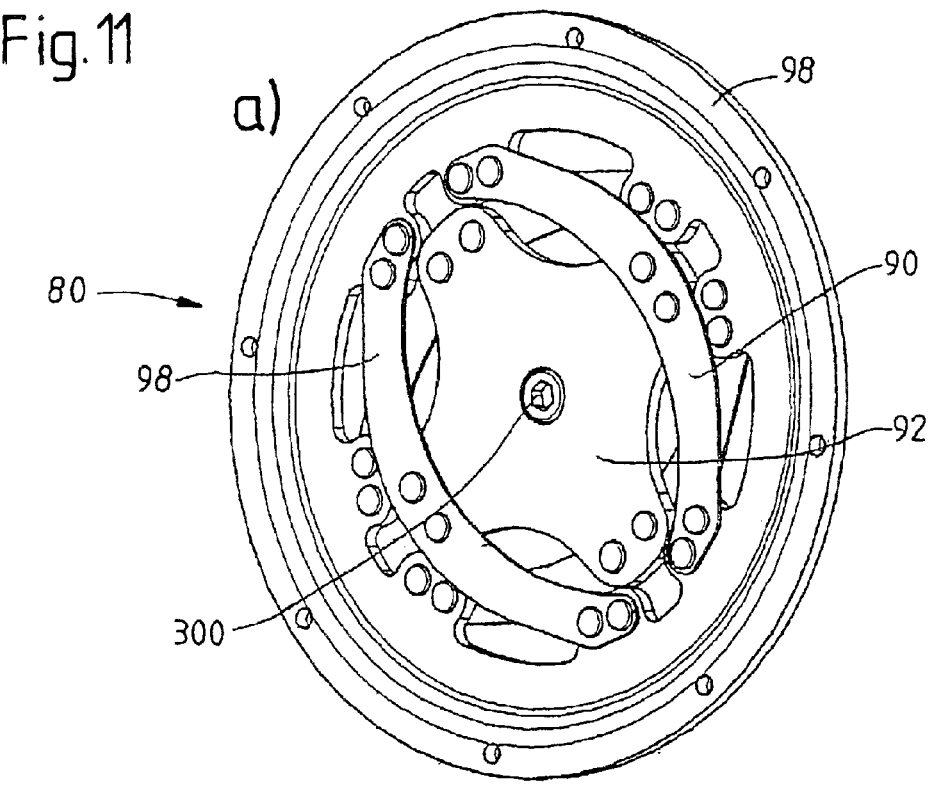
b)
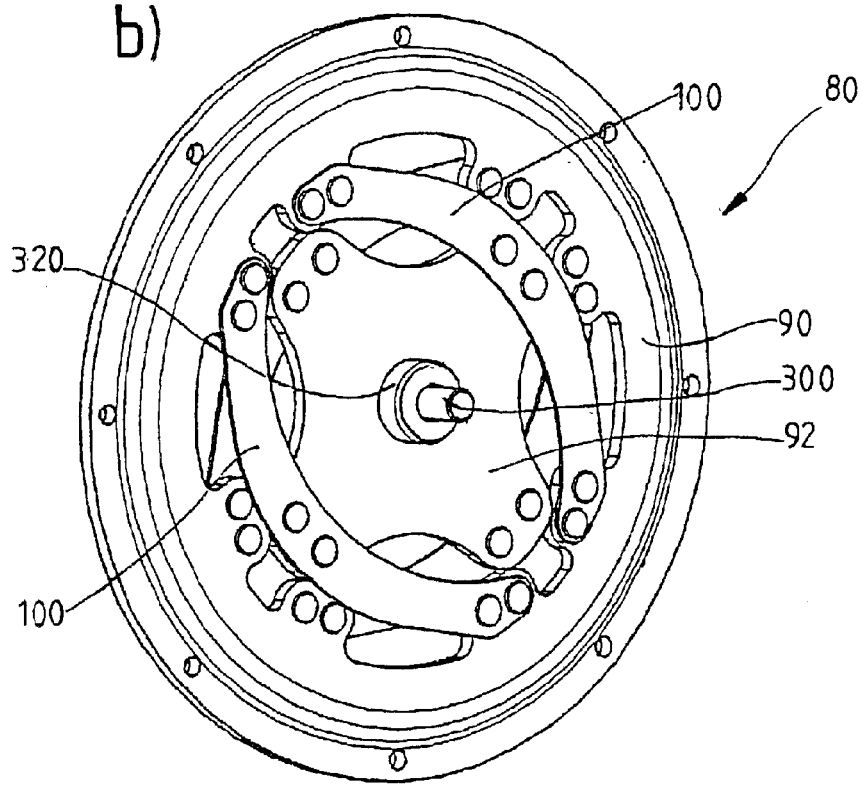

CLUTCH DEVICE CONNECTED CENTRALLY ON THE INPUT SIDE TO A ROTATING SHAFT OR ROTATING COMPONENT IN A MOTOR VEHICLE DRIVE TRAIN

BACKGROUND OF THE INVENTION

1. Field of the Invention

In accordance with a first particular aspect, the invention pertains to a motor vehicle drive train with a multi-clutch device, especially with a dual clutch device, installed between a drive unit and a transmission to transmit torque between the drive unit and the transmission, where the clutch device comprises a first clutch arrangement assigned to a first transmission input shaft and a second clutch arrangement assigned to a second transmission input shaft, where the transmission input shafts are essentially coaxial to an axis of rotation of the clutch device. A where an input side of the clutch device is connected either directly or indirectly by way of a torque-transmitting arrangement to a connecting end of a power takeoff shaft of the drive unit, and the torque-transmitting arrangement has a radially outer connecting area for the connection to the clutch device and a radially inner connection area for the direct or indirect connection to the connecting end.

2. Description of the Related Art

The main type of clutch in question here is a dual clutch device of the friction disk type, referred to in brief as a dual clutch, which has at least one clutch disk per clutch arrangement to serve as the clutch disk and an associated clamping plate, by means of which at least one friction area of the clutch disk can be pressed against an opposing support area, which can rotate in common with a housing arrangement of the clutch device. It is also quite conceivable, however, that the ideas of the invention presented below could also be applied to clutch designs of other types. The torque-transmitting arrangement can be an integral part of a clutch module which comprises the clutch device; that is, the torque-transmitting arrangement and the clutch module can constitute a single component which forms the clutch device, or the torque-transmitting arrangement can be a component or assembly separate from such a module, in which case it could be provided in the form of, for example, a flexplate.

Especially in the case of dual clutch systems with their-relatively complex pressure plate geometries, the clutch disks must usually be premounted between the pressure plate and the associated clamping plate. To connect the clutch device to the power takeoff shaft, a torque-transmitting arrangement in the form of a flexplate is frequently used, which is attached by several screws arranged around a reference circle to a connecting end of the power takeoff shaft or to a flywheel in cases where a flywheel (possibly a dual-mass flywheel) is attached to the power takeoff shaft first. If the clutch disks are already premounted in the clutch device, it is usually no longer possible in cases where the clutch device is already mounted on the drive unit to gain access to the screw holes located on the reference circle, which means that it is impossible to mount a preassembled unit comprising the flexplate and the clutch device itself, as a single structural unit, on the drive unit, that is, it is impossible to connect the clutch device, using the flexplate, either directly or indirectly, to the power takeoff shaft (possibly the crankshaft) of the drive unit. It is therefore necessary to mount the clutch device itself, which is possibly preassembled as a structural unit, and the flexplate independently of each other in such a way, for example, that the flexplate is connected to the power takeoff shaft first, and then the clutch device is attached to the flexplate, whereupon the drive unit can be connected to the transmission; alternatively, the flexplate is mounted on the drive unit, whereas the clutch device is attached to the transmission, and then the drive unit with the flexplate and the transmission with the clutch device are connected to each other. In any case, the clutch device unit on the one hand and the flexplate (i.e., the torque-transmitting arrangement in general) must be delivered as separate components to the assembly line of the motor vehicle producer, whereupon the assembly steps described above must be carried out. As a rule, the clutch module will be set onto the transmission input shafts first, and then the flexplate will be mounted on the power takeoff shaft (especially the crankshaft), whereupon the transmission and the drive unit (engine) will be connected, and finally the clutch module will be attached to the flexplate from the outside through at least one hole in the transmission housing shroud by means of, for example, at least three screws or the like distributed around the circumference. This assembly procedure is very complicated and also highly susceptible to error, because it is difficult to verify that the assembly work has been carried out properly, especially that the flexplate has been properly connected to the clutch device.

SUMMARY OF THE INVENTION

The object of the invention is to make it possible to install a preassembled installation unit comprising the clutch device itself and the torque-transmitting arrangement (possibly the flexplate or flexplate arrangement) into the drive train as a single unit without the need to separate the torque-transmitting arrangement from the clutch assembly afterwards. It would be especially ideal if this installation unit could also comprise the actuation unit belonging to the clutch device, so that the drive train would then consist in practical terms of only three components, namely, the drive train, the transmission, and the installation unit described above.

According to the invention, the torque-transmitting arrangement is connected nonrotatably under mediation of at least one positive connecting element, which nonrotatably connects the radially inner connecting area to the connecting end or to a component or assembly attached nonrotatably to the connecting end and which secures the radially inner connecting area to the connecting end or to the component or assembly in the axial direction, where the positive connecting element is located in a central radial area relative to the axis of rotation, which area is essentially equal to or smaller than the radial area occupied by the transmission input shafts.

Because the positive connecting element, such as a screw or a threaded bolt, is located in the central radial area or is installed there during the assembly procedure, it becomes possible to proceed in the axial direction to install the positive element in the central radial area. Once the positive connecting element has been installed, it can be accessed in its central radial area from the axial direction when necessary for the sake of maintenance or repair so that, for example, the clutch device or the above-cited installation unit can be replaced.

As a rule, it will be advisable for the radial area occupied by the radially inner transmission input shaft to comprise the central radial area.

If the clutch arrangements in question are clutch arrangements of the friction disk type, each of which has at least one clutch disk serving as a friction disk, which is mounted nonrotatably by its connecting hub to the assigned transmission input shaft, then it is preferred that, in a state corresponding to an open or as yet unassembled drive train where the transmission and the drive unit are separate from each other, the positive connecting element be accessible or installable through a central channel in the clutch device mounted on the drive unit. This central channel is defined by the receiving openings in the connecting hubs for the transmission input shafts assigned to them and possibly by a central opening in an actuating module, which is connected to the clutch device to form a single structural unit and which serves to actuate the clutch arrangements, this opening allowing the transmission input shafts to pass through in the axial direction.

The proposals according to the invention are not limited to motor vehicle drive trains with multi-clutch devices or dual clutch devices. Therefore, in accordance with a general aspect of the invention, a motor vehicle drive train is provided with a clutch device between a drive unit and a transmission to transmit torque between the drive unit and the transmission, which has at least one transmission input shaft, where the clutch device comprises at least one clutch arrangement assigned to a transmission input shaft. An input side of the clutch device is connected directly or indirectly by way of a torque-transmitting arrangement to a connecting end of a power takeoff element of the drive unit, and the torque-transmitting arrangement has a radially outer connecting area for connection to the clutch device and a radially inner connection area for the direct or indirect connection to the connecting end. The drive train is characterized in that the torque-transmitting arrangement is connected nonrotatably under mediation of at least one positive connecting element, which nonrotatably connects the radially inner connecting area to the connecting end or to a component or assembly attached nonrotatably to the connecting end and which secures the radially inner connecting area to the connecting end or to the component or assembly in the axial direction, where the positive connecting element is located in a central radial area relative to the axis of rotation, which area is essentially equal to or smaller than the radial area occupied by one of the minimum of one transmission input shafts. A radial area occupied by the transmission input shaft can comprise the central radial area. In the case of a clutch arrangement of the friction disk type, which has at least one clutch disk serving as a friction disk, which is mounted nonrotatably by a hub to its assigned transmission input shaft, it is preferred that, in a state corresponding to an open or as yet unassembled drive train where the transmission and the drive unit are separate from each other, the positive connecting element be accessible or installable through a central channel in the clutch device mounted on the drive unit, which channel is defined by a receiving opening in the connecting hub for the transmission input shaft assigned to it and possibly by a central opening in an actuating module, which is connected to the clutch device to form a single structural unit and which actuates the clutch arrangement, this opening allowing the transmission input shaft to pass through in the axial direction.

A positive connecting element which is located precisely in the center is preferred, such as a screw located exactly in the center. When the positive connecting element is in a radial area near the axis of rotation, it can be installed or accessed very easily in the axial direction.

It is not completely excluded that the minimum of one positive connecting element itself could establish the connection for rotation in common between the radially inner connecting area and the connecting end or a component or assembly attached nonrotatably to the connecting end. Nevertheless, it is preferred that the positive connecting element indirectly establish or secure the connection for rotation in common between the radially inner connecting area and the connecting end or a component or assembly attached nonrotatably to the connecting end, in that this positive connecting element holds or presses associated rotational driver formations or rotational driver areas against each other in mutual, rotationally driving engagement. For example, rotational driver formations can be provided which comprise serrations or at least one SAE gear set, preferably one without play. Another advantageous possibility is for the rotational driver formations to comprise at least one combination of a projection and a receptacle for the projection. For example, at least one mortise-and-tenon combination or a peg and hole combination could be used.

In addition to a positive connection (especially a positive central connection), however, it is also possible to consider a non-positive, frictional connection (especially a frictional central connection) of the clutch device to the connecting end or to the component or assembly attached to the connecting end. Thus, the positive connecting element can hold or press associated rotational driver areas in mutual frictional engagement for rotation in common. The rotational driver areas can be formed by essentially rotationally symmetric contact surfaces or can have essentially rotationally symmetric contact surfaces. It is preferable for the contact surfaces to be formed by the circumferential surfaces of a cone-conical hole combination, which is in a central location, especially in a location essentially coaxial to the axis of rotation.

In the case of motor vehicle clutches, axial impact and vibrational excitations as well as wobbling excitations emanating from the drive unit can cause problems. The flexplates usually used to connect the clutch device to the power takeoff shaft of the drive unit, especially to the crankshaft of an internal combustion engine, are unable to absorb or to equalize such wobbling movements sufficiently, nor are they able to absorb or to equalize axial vibrations sufficiently.

The applicant has the goal of providing dual clutches of the friction disk type in which an actuating module, serving to actuate the clutch arrangements, forms a single structural unit with the clutch device itself. The axial length of the clutch module will be a predetermined value. The axial space available in a drive train to accommodate the overall module consisting of this structural unit is also a preestablished design value. Even if all the components are within the prescribed manufacturing tolerances, it is therefore possible for an undesirable force-fit in the axial direction to occur when the overall module is installed in its the proper position in the drive train.

Against this background, it is proposed that the torque-transmitting arrangement for the motor vehicle drive train be designed with elasticity in the axial direction so that axial tolerances can be compensated and/or so that the clutch device can be disconnected from axial impact and/or vibrational excitations. It is also proposed that the torque-transmitting arrangement be designed with elasticity for the tipping/wobbling of the connecting end relative to a plane of the clutch device orthogonal to the axis of rotation, so that the clutch device can be disconnected from the tipping and/or wobbling of the connecting end. Because the proposed torque-transmitting arrangement makes it possible to compensate for axial tolerances, undesirable force-fitting can be avoided without the need to remain within very narrow tolerances with respect to the axial dimensions of the overall structural unit and of the axially adjacent drive unit (or of the axially adjacent transmission in the drive train), which define the axial space available. Because, in contrast to the rigid connection of the clutch device to the power takeoff shaft via the conventional flexplate, the proposed torque-transmitting arrangement ensures the appropriate disconnection of the components, essentially none of the excitations coming from the drive unit (axial and/or wobbling excitations) are transmitted to the clutch device.

It is also proposed for the motor vehicle drive train that the torque-transmitting arrangement have an axial elasticity and/or an elasticity with respect to the tipping/wobbling of the connecting end relative to a plane of the clutch device orthogonal to the axis of rotation such that a resonance frequency of the potentially vibrating system formed by the torque-transmitting arrangement and the clutch device with respect to axial vibrations and/or tipping/wobbling in the drive train is below a vibration excitation frequency corresponding to the no-load rotational speed. According to this proposal for further elaboration, it is ensured that the vibrating system is detuned with respect to the excitation frequency, especially important in practice, coming from the drive unit, so that, at least for this excitation frequency, a very effective disconnection is guaranteed between the drive unit and the clutch device.

For the drive train, it is also proposed that the torque-transmitting arrangement have a radially intermediate deformation area, which is designed with elastic resilience in the axial direction and which is designed with elastic resilience for the tipping/wobbling of the radially inner and radially outer connecting areas with respect to each other.

In accordance with this proposal for elaboration, a torque-transmitting arrangement of especially advantageous design is provided, which is especially effective at compensating for axial tolerances, i.e., which can equalize and disconnect axial excitations and/or tipping excitations.

It is also proposed by way of elaboration that the radially outer connecting area be formed by a ring-shaped section; that the radially inner connecting area be formed by a preferably plate-shaped central or hub section; and that the deformation area comprise at least one connecting section, which connects the ring-shaped section to the central hub area, preferably several connecting sections which connect the ring-shaped section to the central or hub area. What is intended here in particular is that the radially outer connecting area is formed by a ring-shaped part; that the radially inner connecting area should is by a preferably plate-shaped central or hub area; and that the deformation area comprises at least one connecting part, which connects the ring-shaped part to the central or hub part, preferably several connecting parts which connect the ring-shaped part to the central or hub part, where the ring-shaped part, the minimum of one connecting part, and the central or hub part are to be produced as separate parts, which are then connected to each other, preferably by riveting, to form the torque-transmitting arrangement.

The ring-shaped part and the central or hub part can be made inexpensively as sheet-metal parts. For the connecting parts, it has been found advantageous to design them in the form of strips. As an elaboration, it is proposed that the strip-like connecting parts extend in the circumferential direction over a certain circumferential angle. The connecting parts can be designed inexpensively as leaf springs or sheet-metal strips.

A design which offers a favorable axial softness or softness in the tipping direction and which is also advantageous in terms of production technology is characterized in that a middle area of the connecting part in question is connected to the central or hub part, whereas its two ends are connected to the ring-shaped part. The connecting parts can overlap each other axially to a certain extent. It is proposed in particular in this regard that the connecting parts, proceeding from the associated ends connected to the ring-shaped part, cross over each other in pairs somewhere in the intermediate area between these first ends and the other ends, i.e., the middle areas, which are connected to the central or hub part.

The torque-transmitting arrangement can be designed advantageously with a damping element arrangement to damp vibrations or vibrational excitations. For this purpose, it is proposed as being especially preferred that the damping element arrangement be integrated into the torque-transmitting arrangement between the radially outer connecting area and the radially inner connecting area, parallel to the deformation area, and that it exert a damping effect between the radially outer connecting area and the radially inner connecting area with respect to relative axial movements and/or relative tipping/wobbling. Another advantageous possibility is to integrate the damping element arrangement into the torque-transmitting arrangement between the radially outer connecting area and the deformation area and/or between the deformation area and the radially inner connecting area so that it can exert a damping effect between the radially outer connecting area and the deformation area and/or between the deformation area and the radially inner connecting area with respect to relative axial movements and/or relative tipping/wobbling.

The damping element arrangement can comprise a plurality of preferably viscoelastic, possibly strip-shaped, damping elements.

The invention also pertains to a clutch system for a drive train according to the invention, comprising a clutch device, possibly a dual clutch or multi-clutch arrangement, for the transmission of torque between the drive unit and a transmission, where the clutch device comprises at least one clutch arrangement assigned to a transmission input shaft, and where an input side of the clutch device is or can be connected either directly or indirectly by way of torque-transmitting arrangement to a connecting end of a power takeoff shaft of the drive unit. According to the invention, the torque-transmitting arrangement is designed in the same way as the torque-transmitting arrangement of the drive train according to the invention.

The invention also pertains to a torque-transmitting arrangement for the direct or indirect connection of a clutch device, possibly a dual clutch or multi-clutch arrangement, to the power takeoff shaft of a drive unit in a drive train according to the invention. According to the invention, the torque-transmitting arrangement is designed in the same way as the torque-transmitting arrangement of the drive train according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 7a and 7b are front and rear perspective views of a flexplate arrangement for the central connection of a clutch device to a power takeoff shaft of a drive unit;

FIGS. 9a and 9b are front and rear perspective views of a design variant of the flexplate arrangement of FIG. 7;

FIGS. 11a and 11b are front and rear views of another design variant of the flexplate arrangement of FIG. 7;

DETAILED DESCRIPTION OF THE PRESENTLY PREFERRED EMBODIMENTS

Figure 1:
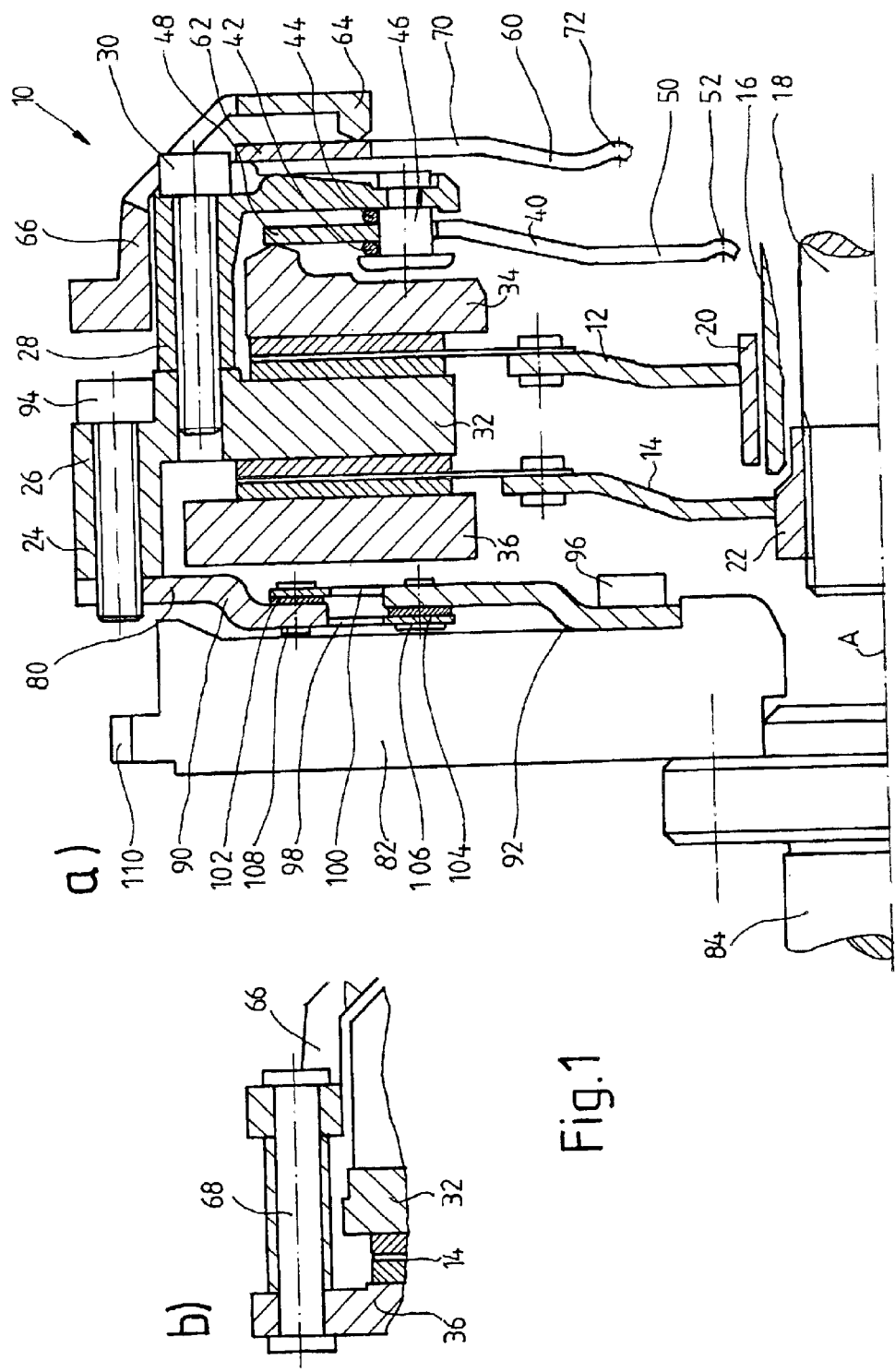
FIG. 1a is a cross sectional view of a first exemplary embodiment of a dual clutch of the friction disk type, which is in torque-transmitting connection with the power takeoff shaft of a drive unit (especially an internal combustion engine) by way of a flexplate arrangement with softness with respect to axial and wobbling movements, taken on a first cross-sectional plane containing the axis of rotation.
FIG. 1b is a cross-sectional view on a different cross-sectional plane-containing the axis of rotation.

Various aspects of the invention, including advantageous possibilities of further elaboration, are described below on the basis of special exemplary embodiments, namely, so-called dual clutches of the friction disk type, where the exemplary embodiments of FIGS. 1, 4, 5, 8, 10 and 12 show dual clutches of the NORMALLY CLOSED (normally engaged) type, which are actuated (disengaged) by pushing on them. These various inventive aspects, however, are independent of the type of clutch and the method of actuation. The various inventive aspects can be applied both to simple clutches (with only one clutch arrangement) and to dual clutches (or multi-clutch arrangements in general, with two or more clutch arrangements), including clutches of the NORMALLY OPEN and of the NORMALLY CLOSED type, regardless of how they are actuated, that is, regardless of whether clutches are actuated by pushing on them or by pulling on them. At least some of the aspects of the invention and at least one of the possibilities of further elaboration, especially that involving the central connection and the connection of the clutch (clutch device) to the power takeoff shaft of the drive unit with softness for axial and wobbling movements under the intermediate action of a torque-transmitting arrangement according to the invention, specifically of a flexplate arrangement according to the invention, can also be of interest in conjunction with wet-running single and dual clutches (multi-clutches in general) of the multi-plate clutch type.

FIGS. 1a and 1b show a dual clutch 10 of the friction disk type, which has a first clutch disk 12 of a first clutch arrangement and a second clutch disk 14 of a second clutch arrangement. The first clutch disk 12 is connected in a torque-transmitting manner by known means to a transmission input shaft 16 designed as a hollow shaft; the second clutch disk 14 is connected in torque-transmitting manner by known means a second transmission input shaft 18, which extends coaxially through the first transmission input shaft 16. Each of the clutch disks has, for example, a connecting hub 20, 22, which is pushed onto the transmission input shaft in question and connected nonrotatably to it by driver formations.

The dual clutch 10 has a housing arrangement 24, which comprises a first housing part 26 and a second housing part 28, which are connected to each other by threaded bolts 30.

A ring-shaped section of the first clutch disk 12, which carries friction linings on both sides, is located axially between a pressure plate section 32 of the housing part 26, forming an opposing support for the clutch disk, and a clamping plate 34, mounted in the housing arrangement with freedom of axial movement. The second clutch disk 14 is mounted with its ring-shaped area, carrying friction linings on both sides, axially between the pressure plate section 32 forming the opposing support for the clutch disk and a second clamping plate 36, also mounted in the housing arrangement with freedom of axial movement. The two clamping plates are each held in the housing arrangement in a manner known in and of itself by tangential springs (tangential leaf springs) or the like and subjected by the springs to pretension in the opening, i.e., release, direction.

A first disk or diaphragm spring 40, which is supported by support rings 42, 44 and a centering bolt 46 on a radially inward-projecting, ring-shaped section of the second housing part 28, acts on the first clamping plate 34. FIG. 1 shows the first diaphragm spring in the unactuated state. In this state, the ring-shaped section 48 of the diaphragm spring 40 acts in the closing, i.e., engaging, direction on the first clamping plate 34, so that this plate is pressed against the first clutch disk 12 at maximum pressure, the clutch disk therefore being clamped at maximum force between the opposing support of the pressure plate 32 and the clamping plate 34. The first clutch arrangement is therefore completely engaged. To release the first clutch arrangement, the actuating tongues or actuating levers 50 of the diaphragm spring 40 must be deflected toward the drive unit, that is, toward the left in FIG. 1, by the application of appropriate axial forces on their ends 52. The diaphragm spring then pivots between the support rings 42, 44, which form a pivot bearing, so that the axial forces acting on the clamping plate 34 are reduced, and the clamping plate 34 can move axially toward the right under the action of its own spring-loading or the clamping forces acting on the clutch disk 34.

A second diaphragm spring or disk spring 60 is assigned to the second clamping plate 36. The ring-shaped section 62 of this spring is clamped between support sections of the first housing part 28 and a ring-shaped support section 64, forming a defined support radius, of a force-transmitting element 66, which is designed as a ring-shaped part, connected to the second clamping plate 36 by connecting bolts 68, serving as tie rods. In the state shown in FIG. 1, the second diaphragm spring 60 is pressing the force-transmitting element 64 toward the transmission, that is, toward the right in FIG. 1, as a result of which the second clamping plate 36 is pressed against the second clutch disk 14, and the clutch disk is accordingly clamped axially between the second clamping plate 36 and the pressure plate 32. FIG. 1 shows the state of maximum engagement of the second clutch arrangement as well. To release the second clutch arrangement, the actuating tongues or actuating levers 70 are deflected toward the drive unit, that is, toward the left in FIG. 1, by the application of appropriate axial forces on their ends 72.

In the exemplary embodiment of FIG. 1, the dual clutch 10 is connected by a flexplate arrangement 80, referred to in the following simply as a flexplate, to a dual-mass flywheel 82, which is itself connected to the takeoff shaft 84 of a drive unit, especially an internal combustion engine. Under certain conditions it is possible to omit the dual-mass flywheel or even a simple flywheel, especially because the pressure plate 32 and the clamping plates 34, 36 have a comparatively large rotational mass themselves, which could serve as a flywheel mass. In particular, this rotational mass of the dual clutch could form either a simple (rigid) flywheel mass or, if a dual-mass flywheel is desired, the secondary rotational mass of a dual-mass flywheel.

Figure 2:
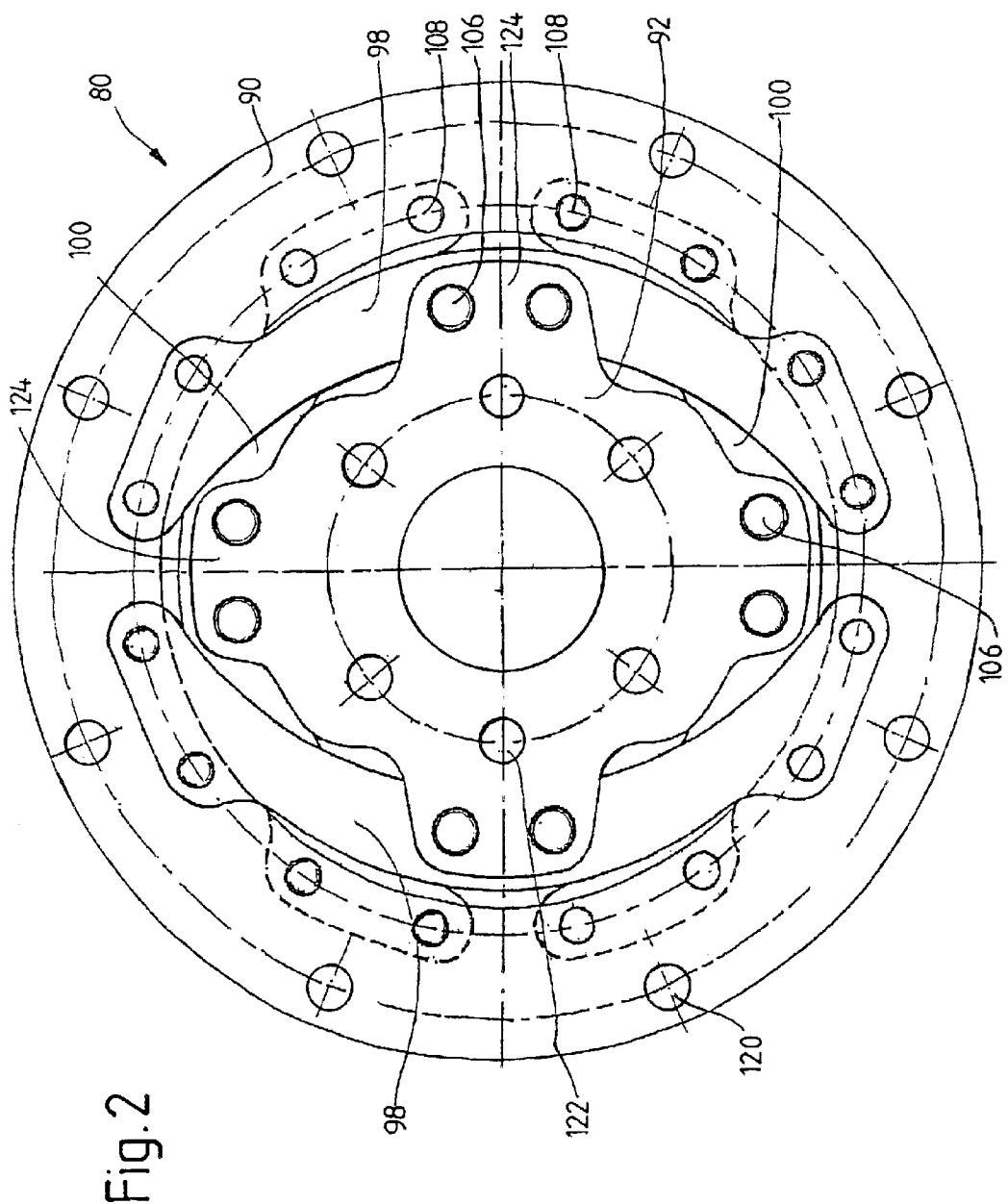
FIG. 2 is an axial view of the flexplate arrangement of the exemplary embodiment of FIG. 1 with softness with respect to axial and wobbling movements.

Looking in the axial direction, we see in FIG. 2 that the flexplate 80 has a ring-shaped outer part 90 and an inner plate, hub, or ring part 92. The outer ring part 90 is connected by connecting screws 94 to the first housing part 26. The inner flexplate part 92 is connected by connecting screws 96 to the dual-mass flywheel 82 or, if a dual-mass flywheel is omitted, to the takeoff shaft 84, especially the crankshaft 84.

The radially outer flexplate part 90 and the radially inner flexplate part 92 are connected to each other by elastic, strip-shaped connecting elements 98, 100, such as by leaf springs 98, 100, where damping elements in the form of, for example, viscoelastic washers 102 and 104 can be provided between the outer flexplate part 90 and the associated connecting element 98 or 100 and/or between the inner flexplate part 92 and the associated connecting element 98 or 100, as shown in FIG. 1. The connections between the indicated flexplate parts, that is, between the radially outer flexplate part 90 and the connecting elements 98, 100 and between the radially inner flexplate part 92 and the connecting elements 98, 100 can be made by riveting, e.g. by rivets 106 and 108.

It is advantageous (especially in terms of cost) to design the outer flexplate part 90 and the inner flexplate part 92 to be made out of metal sheet or plate. The connecting elements 98, 100 can be designed as, for example, thin strips of steel sheet or plate or as leaf springs. The designs used for the flexplate arrangement can be the same as or similar to those already proposed for clutch disks (so-called "wobble-tolerant clutch disks") and for connections between torque converters and drive units.

The flexplate arrangement 80 has an "intentional" axial resilience and also an elastic resilience or "softness" which allows the outer flexplate part 90 to tip relative to the inner flexplate part 92, as a result of which axial and wobbling movements of the crankshaft 84 can be kept away from the dual clutch 10. This is especially important for a dual clutch, because its rotating mass is greater than that of a simple clutch. In the case of a conventional ("rigid") flexplate with only slight axial resilience, there is the danger that an internal combustion engine, being used as the drive unit, will develop excitations during operation which match the natural frequency of the vibrational system (flexplate+clutch) with respect to axial vibrations and possibly with respect to vibrations in the "tipping" direction, that is, wobbling. As a result of the axially resilient flexplate arrangement, the vibrational system can be detuned to such an extent that it is possible to disconnect the drive unit with respect to axial oscillations or vibrations (axial excitations in general) and possibly with respect to wobbling or so-called "wobbling vibrations". The system can, so to speak, operate in the "supercritical" range as soon as the rpm's increase beyond the no-load range. The damping elements, which are advantageous and which, according to FIG. 1, are connected in "series", as it were, with the other elements of the flexplate arrangement, help to eliminate axial vibrations or possibly the wobbling of the vibrational system indicated above or at least to reduce them significantly. The damping elements could also be connected "in parallel" with the connecting elements, as will be explained in greater detail below on the basis of FIG. 4.

In addition to the disconnection of axial movements and/or wobbling, the flexplate arrangement 80 is also highly advantageous in the sense that the axial resilience it provides makes it possible to avoid a "force-fit" during the installation of the clutch, especially of an assembly comprising the clutch and its associated actuating module, in the proper position in the drive train. With respect to a dual clutch of the friction disk type, the following remarks are relevant. For safety reasons (reliably preventing the transmission from locking up when the actuating system fails), at least one of the two clutch arrangements should be designed in accordance with the NORMALLY OPEN principle; this means that the clutch arrangement or the clutch arrangements must therefore be closed actively by the exertion of axial force on the clutch. So that this axial force does not represent a continuous load on the axial bearings of the crankshaft of the internal combustion engine, it is recommended that the flow of axial force be closed within the clutch module (see exemplary embodiment according to FIG. 5). For this purpose, the clutch module and the actuating module can be connected to each other. Then, for integration into the drive train, the complete unit comprising the clutch module and the actuating module is preferably premounted either on the engine side or on the transmission side, in contrast to conventional solutions, in which the clutch module is usually installed on the engine side and the actuating module is attached to the transmission side; then, after the transmission has been mounted on the engine, the two modules are connected to each other. The concept of the preassembly of a complete module being discussed here means that the axial length of the complete module is defined from the beginning, unless complicated additional measures have been taken to allow adjustment to the axial length of the assembly. Because the axial space available in the drive train, especially the axial length of the transmission shroud, is also predetermined geometrically, it would be possible, as a result of manufacturing tolerances, for a force-fit to occur when the preassembled unit is installed in its proper place. This can be compensated, however, by the axial resilience of the flexplate arrangement according to the exemplary embodiment.

It should be added that fastening holes can be provided in a rotationally asymmetric pattern on both the engine side and on the clutch side to ensure the nominal rotational position of the clutch 10 on the takeoff shaft of the drive unit, so that, for example, a signal transmitter responding to the starter gear ring 110 can detect the rotational position of the crankshaft 84 and thus to determine, for example, when top dead center has been reached. With its pressure plate and its clamping plate, the dual clutch 10 according to FIG. 1 will weigh about 13–14 kg. As already mentioned, axial vibrations could occur during normal driving if a conventional (overly rigid) flexplate connection were to be selected. It is important to design the connection of the clutch to the power takeoff shaft with considerable resilience to ensure the previously explained disconnection and preferably to achieve the detuning of the vibrational system with respect to an excitation frequency from the engine (such as the ignition pulse of the last cylinder) in such a way, for example, that the resonance frequency of the vibrational system (flexplate arrangement 80+dual clutch or pressure plate module 10) is below the no-load rotational speed.

FIG. 2 shows an exemplary embodiment of a torque-transmitting arrangement for connecting an input side of the dual clutch to a power takeoff shaft of the drive unit in more detail. FIG. 2 shows in particular a torque-transmitting arrangement 80, which can again be referred to as a flexplate arrangement, which, in correspondence with the example of FIG. 1, has an outer ring part 90, a central or hub part 92, and connecting elements 98, 100, which connect the outer ring part 90 and the central or hub part 92 to each other. The connecting elements can be riveted to the outer ring part 90 and to the inner central or hub part 92, where, in the area of the rivets, damping elements (such as the previously mentioned viscoelastic elements), which are effective at damping in the axial direction, can be provided between the components indicated in order to damp axial vibrations. Fastening holes 120 are provided for the connecting screws 94; fastening holes 122 are provided for the connecting screws 96. The connecting elements are riveted to the radially outer flexplate part 90 and to the radially inner flexplate part 92 at rivets 106 and 108, respectively, in FIG. 2.

Each of the connecting elements 98, 100 is designed as a strip, which extends circumferentially for the most part along a radius; each end is riveted twice to the outer flexplate part 90. In an intermediate area, the connecting elements 98, 100 are riveted twice to radially projecting tab sections 124 of the radially inner flexplate part. The flexplate parts 90 and 92 can be designed with bent offset sections, as shown in FIG. 1.

According to FIG. 2, two connecting parts 98 and two connecting parts 100 are provided, which cross each other in pairs in the middle between the end riveted to the outer flexplate part 90 and the center area riveted to the inner flexplate part 92. In spite of the sufficient resilience of the flexplate arrangement with respect to axial movement and wobbling, the flexplate is therefore extremely stable and can in particular transmit torque without any interfering play in the rotational or circumferential direction.

Figure 3:
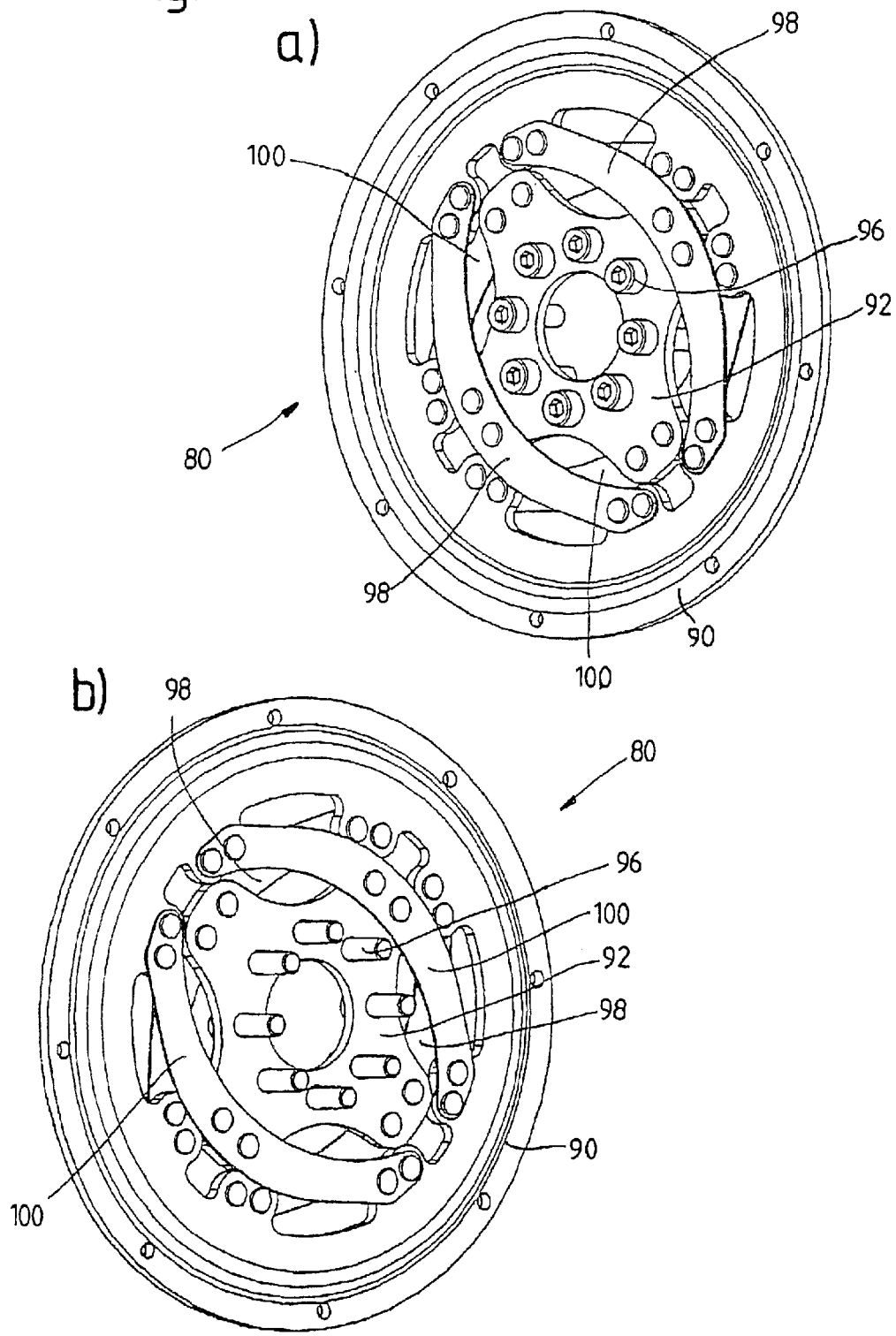
FIGS. 3a and 3b are front and rear perspective views of the flexplate arrangement of FIG. 2.

FIG. 3 shows two perspective views of a design variant of the flexplate arrangement of FIG. 2. The radially outer ring part 90, the radially inner central or hub part 92, and the connecting elements 98, 100 can be seen. FIG. 3a shows the heads, and FIG. 3b shows the threaded sections of the connecting or fastening screws 96.

It should also be pointed out that, with respect to the components of the torque-transmitting arrangement 80 shown in the figures, it would be possible to call only the ring part 90 the flexplate and to call the radially inner central or hub part 92, which is or can be attached to the power takeoff shaft of the drive unit or to a flywheel, for example, a driver. The elastic connecting elements 98, 100, preferably designed as leaf springs, would then be interpreted as connecting elements which connect the flexplate to the driver and which give the torque-transmitting arrangement a much greater resilience and elasticity than the flexplate 90 has on its own.

Figure 4:
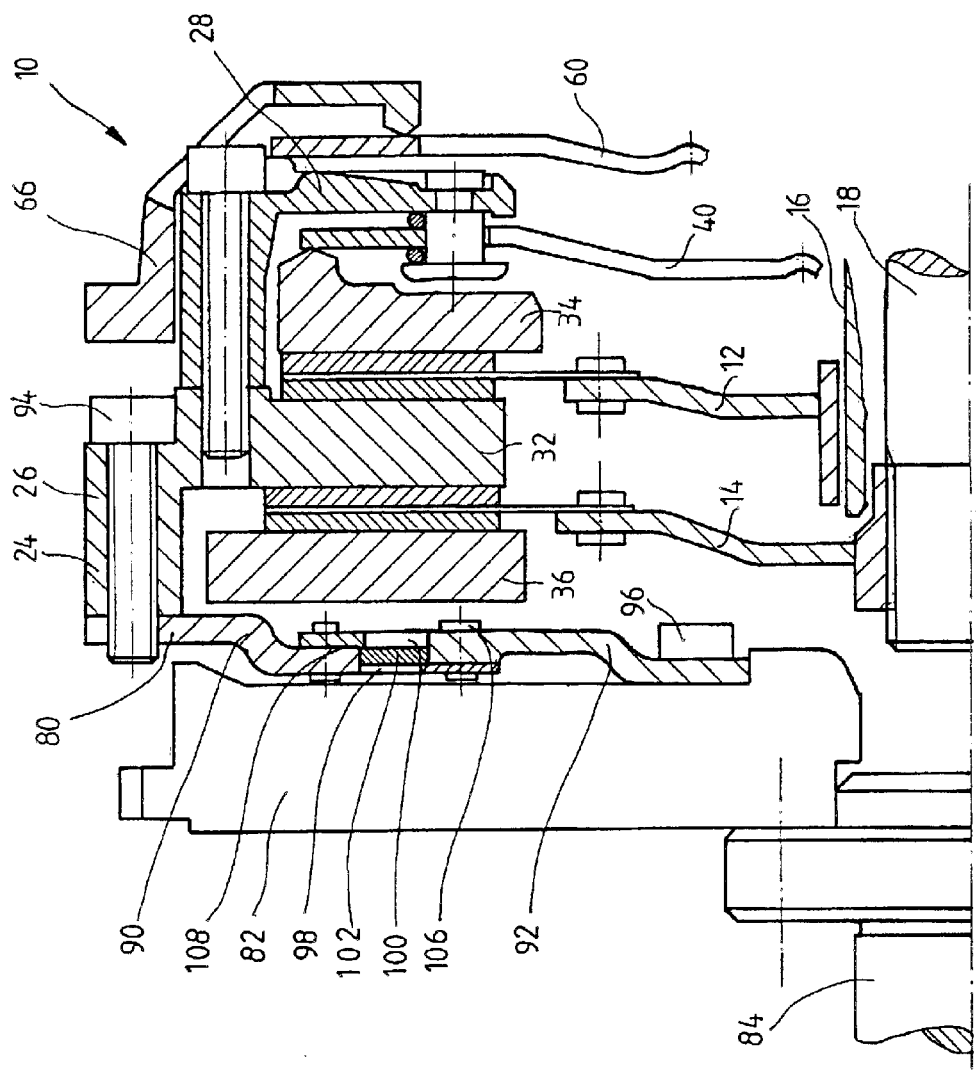
FIG. 4 is a cross-sectional view of a design variant of the arrangement according to FIG. 1.

FIG. 4 shows a design variant of the exemplary embodiment of FIG. 1. The only significant difference is that, between the radially outer ring part 90 and the radially inner central or hub part 92 of the flexplate arrangement 80, damping elements 102 are acting in parallel with the connecting elements 98, 100. That is, the damping elements are not connected in series with the connecting elements but rather in parallel.

Figure 5:
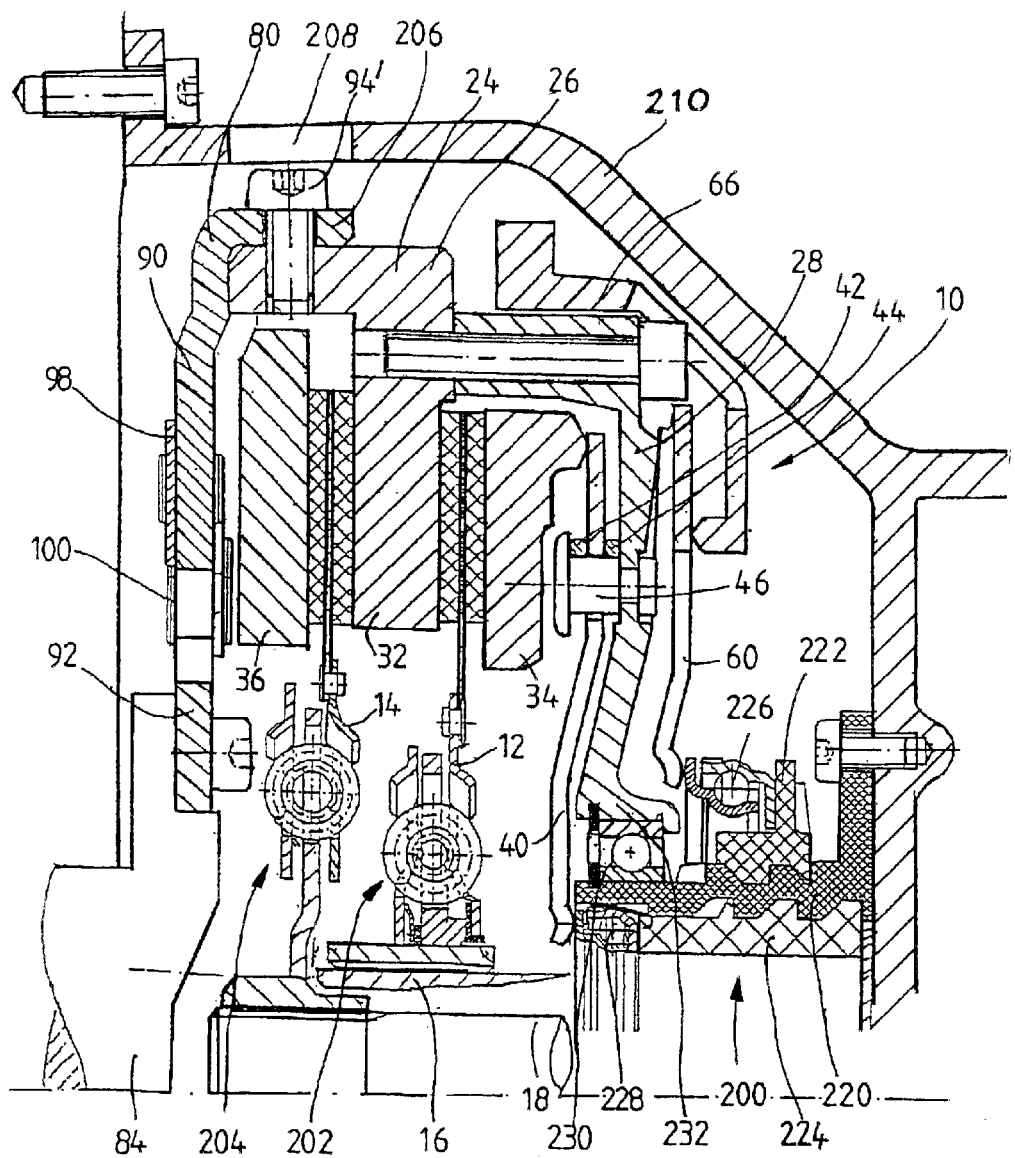
FIG. 5 is a cross another exemplary embodiment of a dual clutch of the friction disk type with an associated actuating module, integrated into the dual clutch to form a single structural unit.

FIG. 5 shows another exemplary embodiment of a dual clutch of the friction disk type together with the associated actuating module 200. A multi-part flexplate arrangement 80 with a radially outer ring part 90 and a radially inner central or hub part 92, which in the present case is attached directly to the power takeoff shaft 84, are again provided. In the present exemplary embodiment, therefore, there is no dual-mass flywheel. Instead, the clutch disks 12 and 14 are not essentially rigid in the rotational direction but rather are designed as clutch disks with integrated torsional vibration dampers 202, 204. The two flexplate parts 90 and 92 are again connected to each other by elastic connecting elements 98, 100 to obtain the previously explained resilience with respect to axial movements and wobbling. With respect to the way in which the radially outer ring part 90 is connected to the clutch housing 24, there is a difference from the exemplary embodiment of FIGS. 1 and 4 to the extent that, as shown in FIG. 5, the components are screwed together in the radial direction by means of connecting screws 94' which pass through an axially oriented collar section 206 of the ring part 90 and into the first housing part 26. The radial screw connection according to FIG. 5 makes it especially easy to assemble the components through the use of at least one assigned opening 208 in the transmission housing shroud 210. It is preferable to provide several such openings 208 at various points on the circumference to limit the degree to which the engine must be turned during assembly or to eliminate the need to turn it altogether.

The actuating module has a central sleeve 220, specially secured against rotation on the transmission housing; this sleeve carries an outer sleeve 222 and an inner sleeve 224. The outer sleeve 222 is internally threaded, the inner sleeve 224 externally threaded, so that they can engage with the central sleeve 220 in such a way that a rotation of the outer sleeve and/or of the inner sleeve relative to the central sleeve causes the sleeve in question (outer sleeve or inner sleeve) to shift in the axial direction. The outer sleeve 222 carries a release bearing 226, and the inner sleeve 224 carries a release bearing 228, across which, by the action of the outer sleeve or inner sleeve, axial forces can be exerted on the diaphragm spring tongues of the diaphragm springs 40, 60 to deflect the actuating tongues of the associated diaphragm springs toward the drive unit and thus to actuate the first and/or the second clutch arrangement in the release direction. To impart an appropriate rotational movement in either the release direction or in the engagement direction to the outer sleeve 222 and to the inner sleeve 224, the sleeves can be provided with, for example, radially projecting lever arms, on each of which an associated actuating element can act.

To provide a closed circuit for the axial forces within the structural unit comprising the dual clutch 10 itself and the actuating module 200, the central sleeve 220 gives axial support to the second housing part 28, which holds the first diaphragm spring 40 by way of support rings 42 and 44 and the positioning or retaining bolts 46. For this purpose, the second housing part 28 extends further inward in the radial direction to a radial and axial bearing 230, which is held radially between the central sleeve 220 and an inside circumference of a ring-shaped section 232 of the housing part 28 and is secured axially by ring-shaped collars or lock washers or the like on the ring-shaped section 232 and the central sleeve 220.

An important aspect of the exemplary embodiment, i.e., of the design idea on which this exemplary embodiment is based, is that, because of the closed circuit within the overall module comprising the dual clutch 10 itself and the actuating module 200 for the flow of axial forces associated with actuation of the clutch, no axial forces which could impose excessive loads on the bearings act on the power takeoff shaft, especially the crankshaft 84, of the drive unit. The axial support is provided advantageously by a central support bearing, i.e., bearing 230 in the case of the present example, acting between the clutch device itself on one side and the associated actuating unit on the other.

The actuating module 200, as already indicated, is connected to the dual clutch 10 itself to form a single structural unit before the dual clutch is integrated into the drive train; this unit can then be premounted in the transmission shroud on the transmission side. On the engine side, the premounted flexplate arrangement 80 is seated on the connecting end of the power takeoff shaft 84, especially the crankshaft 84. When the transmission is to be connected to the engine, the clutch module and the flexplate arrangement 80 are thus moved toward each other and can then be connected to each other by the use of at least one opening 208 in the transmission shroud.

Figure 6:
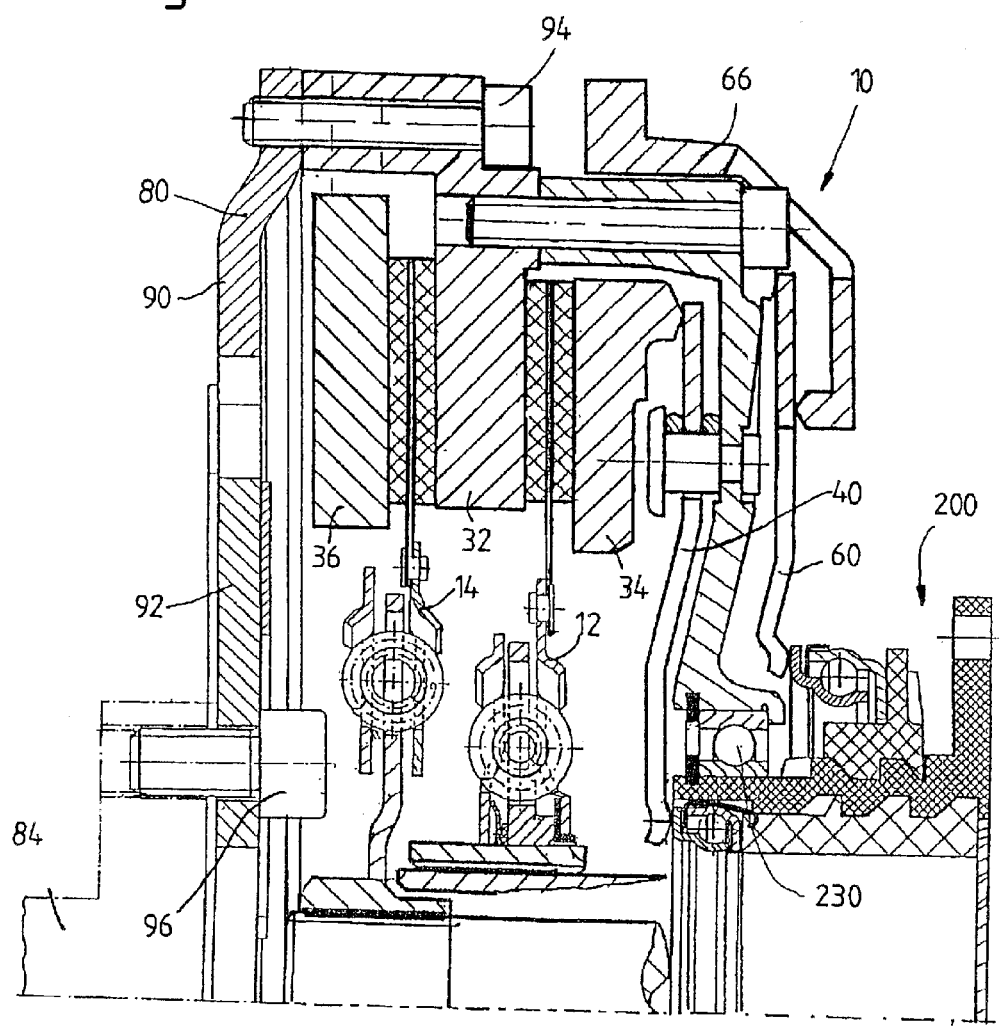
FIG. 6 shows a design variant of the arrangement according to FIG. 5.

FIG. 6 shows another exemplary embodiment of a dual clutch 10 of the friction disk type, which is connected by means of a flexplate arrangement 80 to a crankshaft 84. The conventional connection, which can be seen especially clearly in FIGS. 3a and 3b, is realized here, in which the driver or the central part 92 is screwed by means of several screws 96, preferably located on a reference circle, to the connecting end of the crankshaft 84. If it is desired to integrate the overall module consisting of the dual clutch 10, and the actuating module 200, and the flexplate arrangement 80 as a single structural unit into the drive train, the screws would have to be attached through several access openings inside the clutch module. In the case of the arrangement shown in FIG. 6, however, it is almost impossible to provide these access openings, because the screws 96 are located approximately on the same radius as the central support bearing 230. The best that could be done here would be to mount the dual clutch 10 together with the flexplate arrangement 80 already attached to it, but without the actuating module 200 connected yet, as a single unit to the crankshaft 84. For this purpose, appropriate access openings would have to be provided in the clutch disks 12 and 14. Because the clutch disks are designed with torsional vibration dampers, it is not impossible to provide such access openings, but it is hardly ideal to do so from a design standpoint.

In contrast, examples of torque-transmitting arrangements, specifically flexplate arrangements, are presented in the following, which have the previously explained resilience or elasticity with respect to axial vibration and wobbling but which also, in combination with a single fastening element, specifically a single screw, can also be attached in a positive or nonpositive manner to the power takeoff shaft of the drive unit (specifically to the crankshaft of an internal combustion engine), so as to connect a motor vehicle clutch (especially a dual clutch) without a great deal of assembly work and with axial resilience to the power takeoff shaft. In principle, it is also possible for the vehicle clutch to be connected to a simple flywheel or to a dual-mass flywheel by means of a corresponding torque-transmitting arrangement according to the invention, possibly a flexplate arrangement. An essential aspect is the central location of one or possibly several fastening elements coaxial to or in the immediate vicinity of the axis of rotation of the clutch, so that the fastening element in question can be installed or accessed through a central channel in the clutch or in the preassembled installation unit, i.e., through the channel which holds the transmission input shaft or transmission input shafts.

The flexplate arrangement of FIG. 7 is essentially the same with respect to the axially resilient or wobble-resilient design as the example of FIGS. 3a and 3b. The central part of the driver 92 according to FIGS. 7a and 7b is attached by means of a single fastening element, here specifically by means of a single screw 300, to the power takeoff shaft instead of by several fastening screws 96 arranged on a radius. The screw 300 holds driver formations on the central part 92 and associated counter-driver formations on the power takeoff shaft in mutual, rotationally driving engagement. In the exemplary embodiment, the driver formations are designed, for example, as serrations 302. A preferably play-free set of SAE teeth could also be considered, for example. The fastening screw 300 holds the central part 92 axially tight against an end surface of the connecting end of the crankshaft, so that the driver formations are held in mutual, rotationally driving engagement preferably without any rotational play at all.

Figure 8:
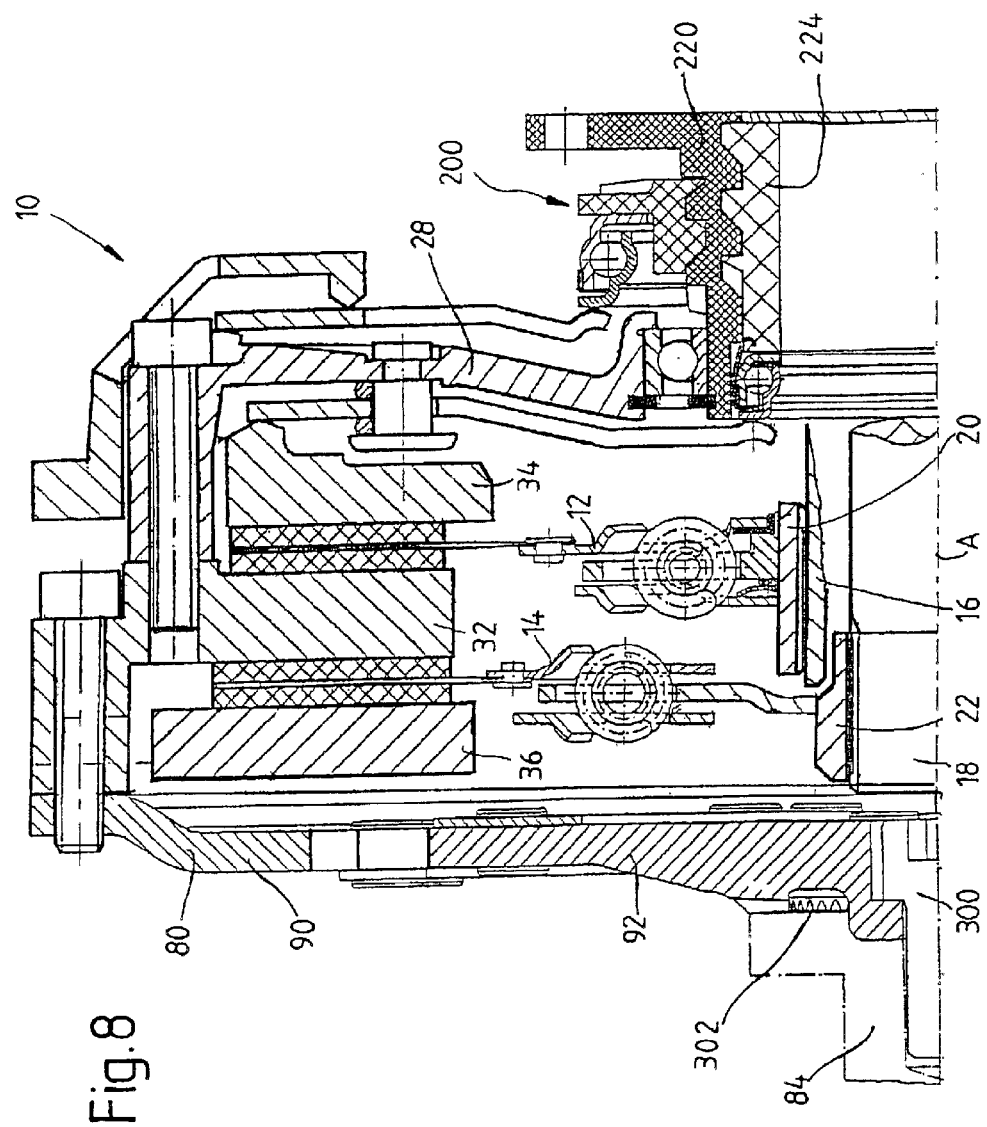
FIG. 8 is a cross-sectional view of a dual clutch of the friction disk type, connected to a crankshaft by the flexplate arrangement of FIG. 7.

FIG. 8 shows a typical installation situation for the flexplate arrangement 80 of FIGS. 7a and 7b. The dual clutch 10 is connected to the crankshaft 84 by the flexplate arrangement 80, where, according to the nomenclature used here, a so-called "central connection" is realized, in which only a single additional fastening element, namely, the screw 300, is used, which in the present case is coaxial to the axis of rotation A and holds the driver formations, here the sets of teeth 302, in mutual, rotationally driving engagement. As can be easily seen in the figure, when the drive train is open, that is, when the drive unit and the transmission 90 are not yet or are no longer connected, the fastening screw 300 is accessible in the axial direction through a central channel passing through the unit consisting of the dual clutch 10, the flexplate arrangement 80, and the actuating module 200, which unit is mounted on the drive unit. This channel is defined by the inner circumference of the inner sleeve 224, by the inner circumference of the connecting hub 20 of the first clutch disk 12, and by the inner circumference of the connecting hub 22 of the second clutch disk 14, which means that this unit can be removed from the drive unit for the purpose of maintenance or repair. Conversely, the fastening screw 300 can be screwed into the connecting end of the crankshaft 84 through this central channel in order to mount the preassembled unit on the drive unit.

What is provided, therefore, is a preassembled installation unit comprising the dual clutch 10, which unit consists of the flexplate arrangement 80, the dual clutch 10 itself along with its clutch disks, and the actuating module 200, which is already connected to the housing section 28. Because of the positive central connection (as an alternative, a nonpositive central connection could also be used, which is explained on the basis of FIG. 11), the installation unit can be connected, preferably screwed, to the power takeoff shaft without a great deal of effort, namely, by the use of the central channel, which offers the necessary access. A preassembled installation unit of this type does not need to be held axially in place in the transmission, which means that problems of axial fit are avoided. In the case of an actuating module of the spindle drive design, such as the module 200, however, the axially stationary support part, that is, the central sleeve 220 in the exemplary embodiment shown here, should be prevented in some suitable way from rotating in the circumferential direction relative to the transmission housing.

In the case of the design variant of FIGS. 9a and 9b, a central fastening screw 300 is again provided to connect the central part 92 to the crankshaft (or alternatively to a flywheel or possibly a dual-mass flywheel). Instead of sets of teeth, two off-center studs or pins 312 are provided on a cup-shaped formation 310 on the central part 92, which studs or pins extend in the axial direction and, in the assembled state, engage in associated receiving holes in the connecting end of the power takeoff shaft or of the flywheel and thus produce the rotationally drive connection between the central part 92 and the power takeoff shaft. In principle, a single off-center rotational driver projection is sufficient. Of course, more than two of these projections (especially pins or studs) could also be provided.

Figure 10:
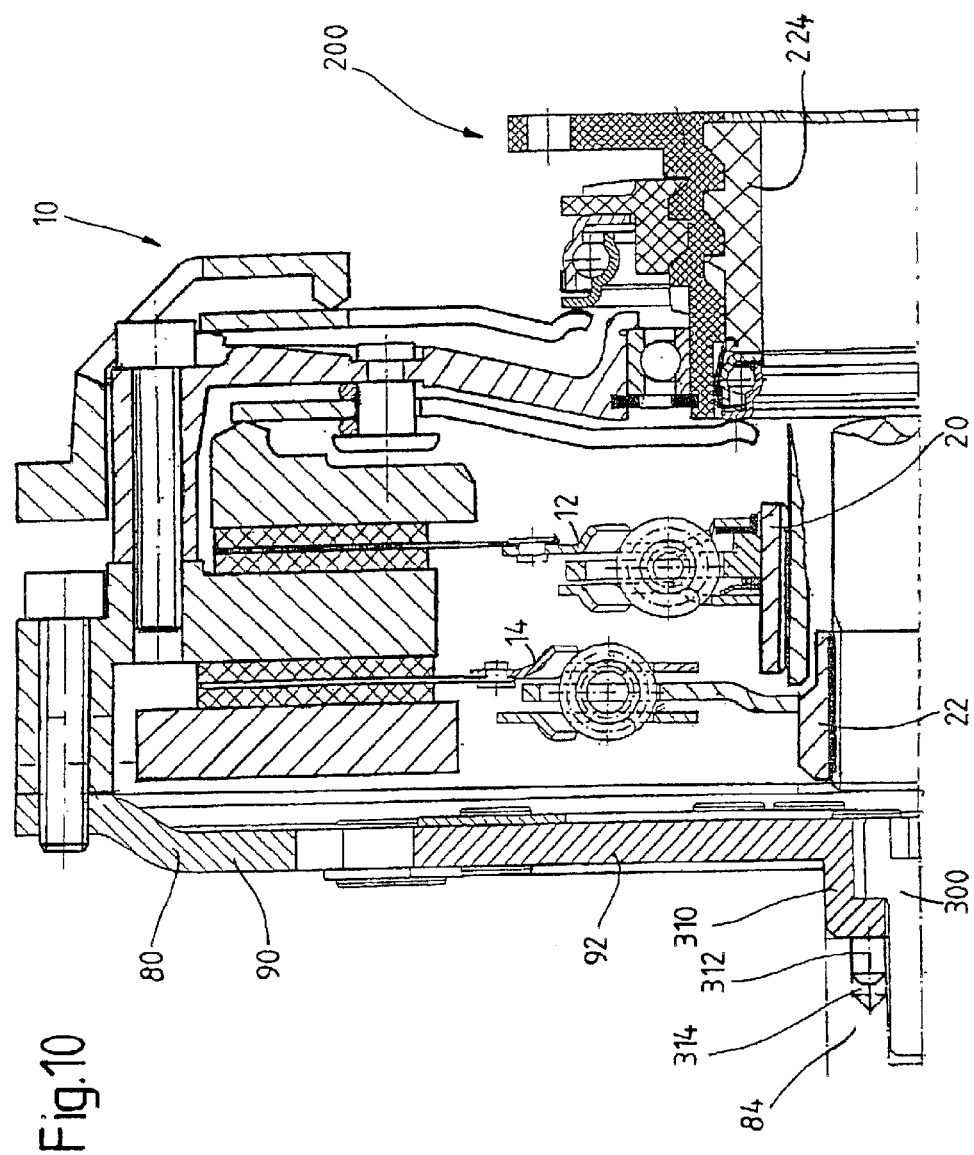
FIG. 10 is a cross-sectional view of a dual clutch of the friction disk type connected to a crankshaft by the flexplate arrangement of FIG. 9.

FIG. 10 shows the installation situation for the exemplary embodiment of FIGS. 9a and 9b. The dual clutch 10 is attached nonrotatably to the power takeoff shaft 84 by the mediation of the central screw 300 and the stud 312, which engages in an associated receptacle 314 in the takeoff shaft 84. The advantages explained in association with FIG. 8 are thus obtained.

In the case of the design variant of FIGS. 11a and 11b, the central part, i.e., the driver 92, has a conical section 320, which could be described as a clamping or tensioning cone, which, when the central part 92 is made of metal sheet or plate, can itself be formed from the sheet or plate material. In the assembled state, this conical section 320 engages in a corresponding conical hole or opening in the connecting end of the power takeoff shaft or flywheel. Tightening the central screw 300 to an appropriate degree brings the conical outside circumferential surface of the section 320 into friction-locking engagement with a corresponding conical inside circumferential surface of the hole (or opening in general). By designing the frictionally locking contact surfaces appropriately and by tightening the central screw properly, that is, by properly pressing the central part 92 against the connecting end or the flywheel in the axial direction, a nonpositive connection of this kind can be produced and maintained, so that the torques occurring during operation can be transmitted without rotational play between the drive unit and the clutch device and thus between the drive unit and the transmission (in the exemplary embodiments, especially a dual clutch or load-switching transmission).

Figure 12:
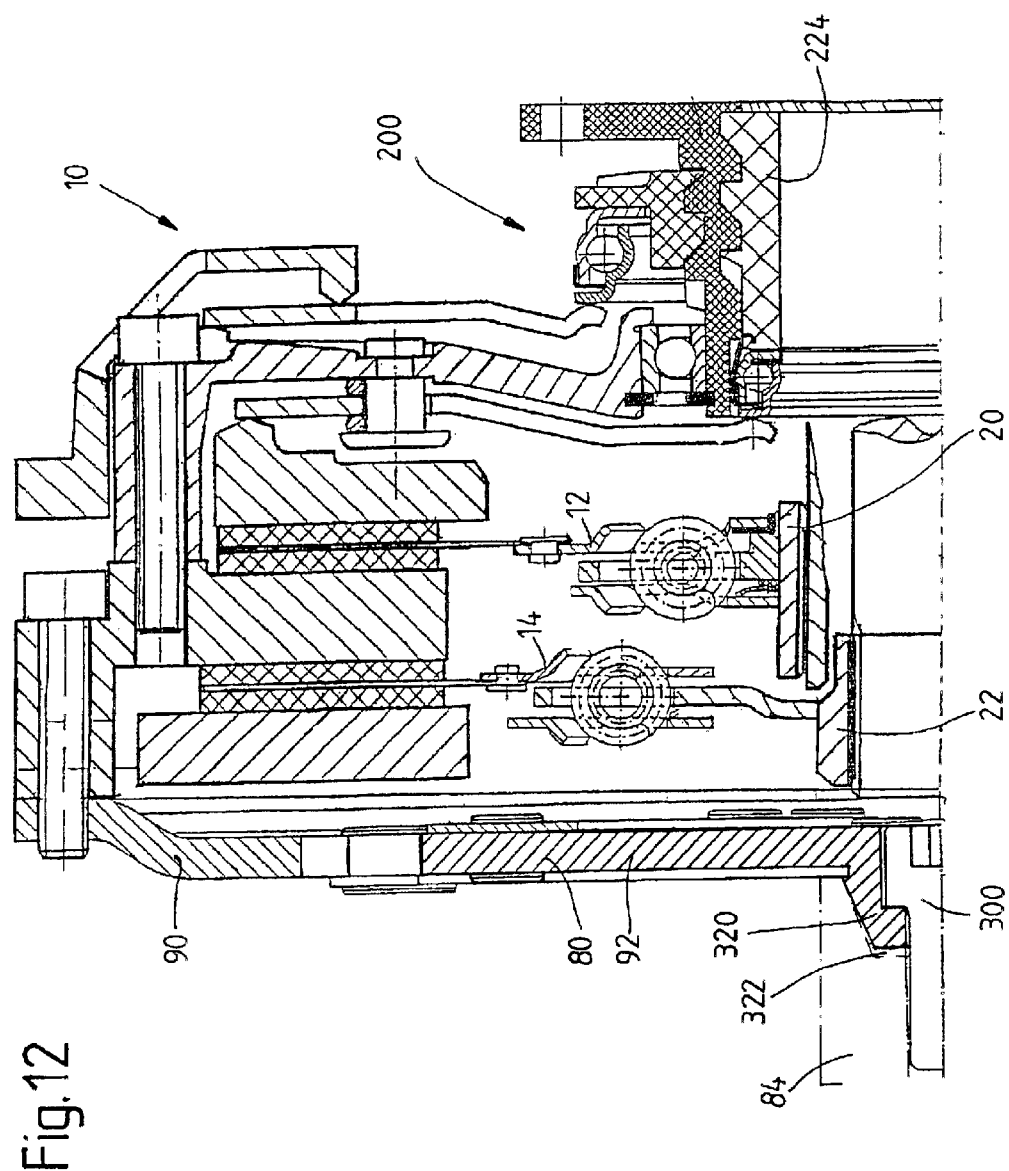
FIG. 12 is a cross-sectional view of a dual clutch of the friction disk type connected to a crankshaft by the flex plate arrangement of FIG. 11.

FIG. 12 shows an example of an installation situation for the flexplate arrangement 80 of FIG. 11. It can be seen how the conical projection or section 320 of the central part 92 engages in an associated conical opening 322 in the crankshaft 84, where a slight difference can be seen between the angle of inclination of the conical outside circumferential surface of the section 320 and that of the conical inside circumferential surface of the opening 322. This results in a strong clamping action with a correspondingly strong nonpositive connection between the two surfaces in question.

Figure 13:
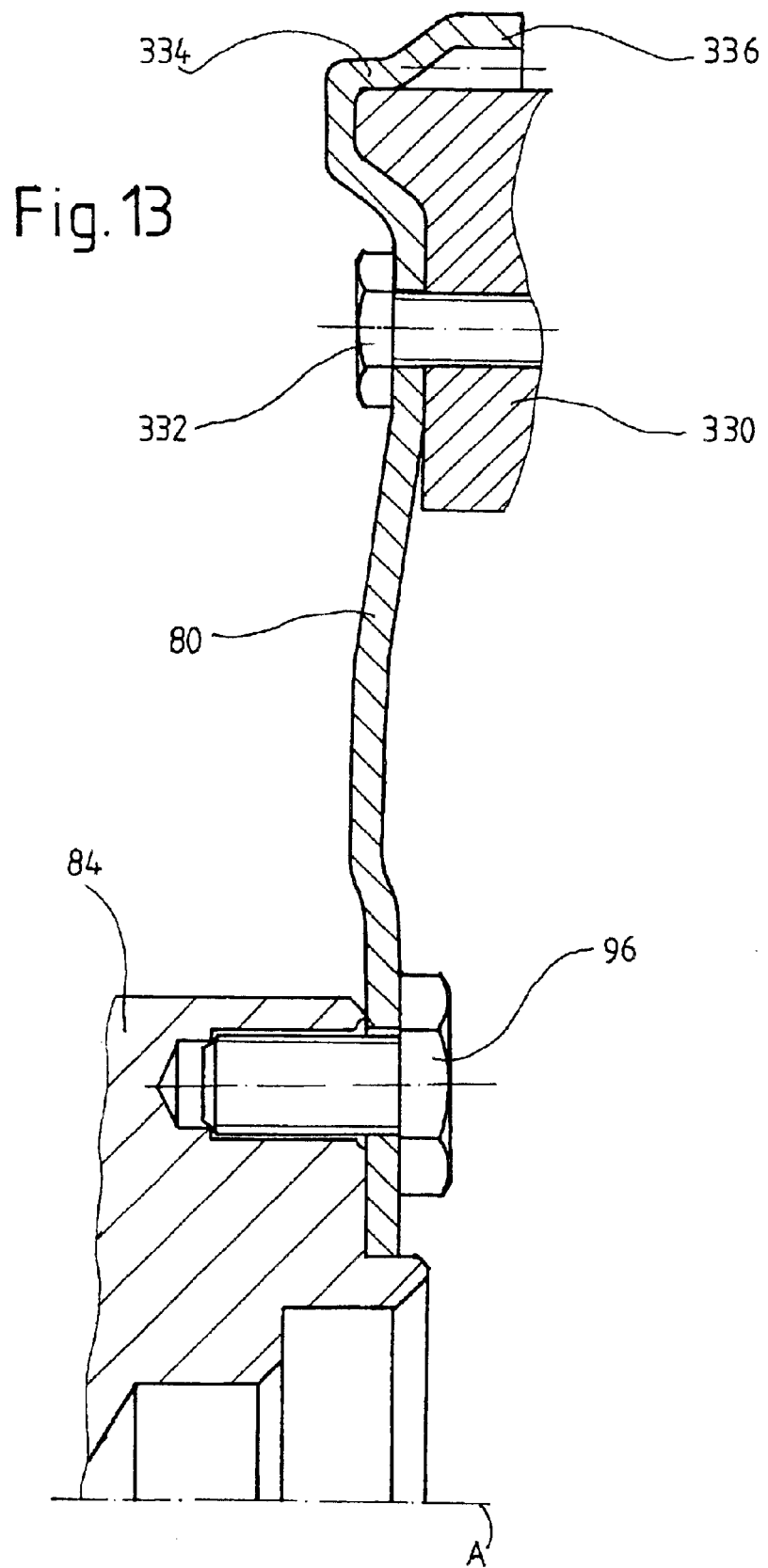
FIG. 13 is a cross-sectional view of a flexplate connected in the conventional manner to a crankshaft, where a ring gear for the starter motor is machined into the flexplate.

FIG. 13 shows flexplate 80, which can be of any design, including a flexplate of conventional design, which is attached nonrotatably by means of connecting elements, especially screws 96, to the power takeoff shaft 84. The screws 96 are arranged on a radius a considerable distance away from the axis of rotation A, so that a central connection in accordance with the nomenclature of this application is not realized. A flywheel 330 can be attached to the flexplate 80 by means of at least one connecting element 332, especially at least one screw 332. The radially outer area of the flexplate carries a starter gear ring 336, formed from a collar section 334 extending in the axial direction. The starter gear ring can be rolled into the metal sheet or plate material of the flexplate 80, for example. Additional areas of the metal sheet or plate material can be raised from the flexplate in order to provide marks for TDC, etc., for example, for the engine control system.

An essential advantage of the design of the flexplate explained above is that the starter gear ring in an integral part of the flexplate and can thus be provided at low cost. In addition, the problems which could arise during the attachment of a separately produced gear ring to a flexplate are avoided.

Figure 14:
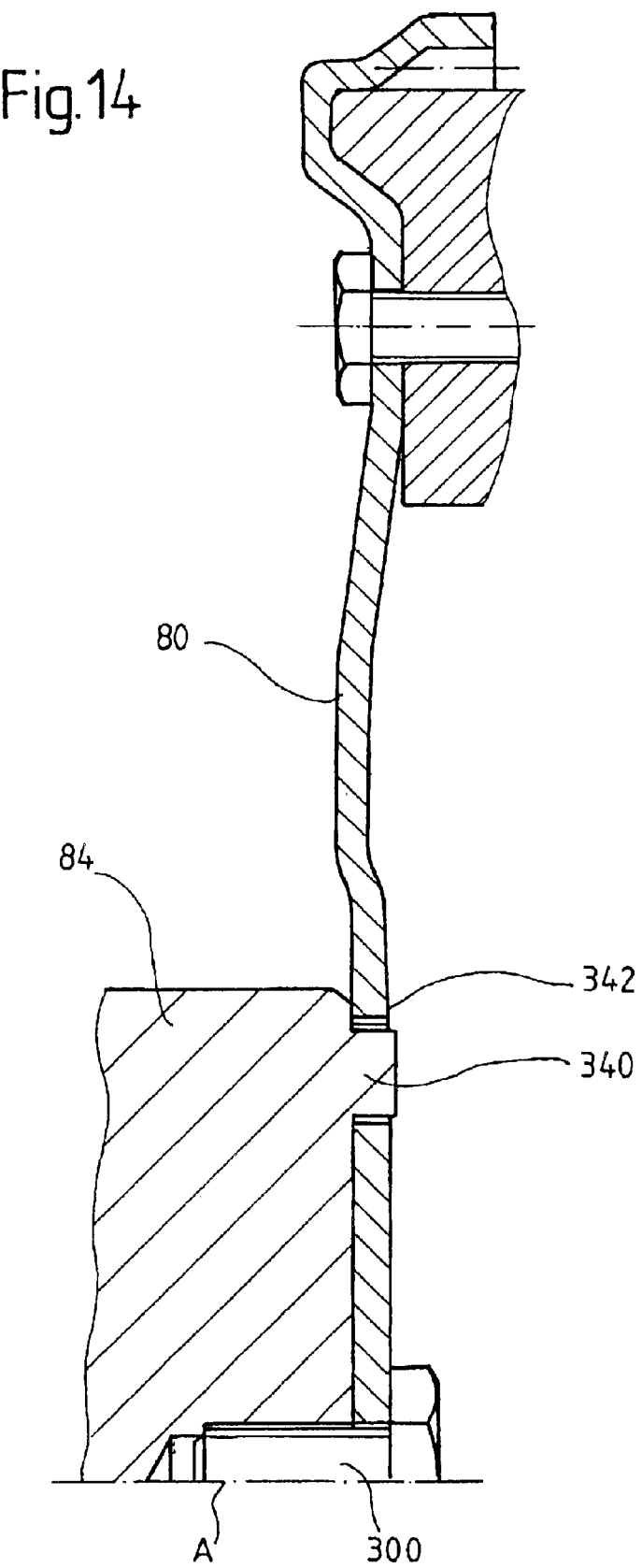
FIG. 14 is a cross-sectional view of a design variant of the flexplate of FIG. 13, designed in accordance with a primary aspect of the invention.

FIG. 14 shows a design variant of the flexplate of FIG. 13. In contrast to the flexplate of FIG. 13, the central connection of the flexplate to the takeoff shaft, especially a crankshaft 84, according to the invention is realized in the case of the flexplate 80 of FIG. 14. A central screw 300 is provided, which is coaxial to the axis of rotation and which holds the flexplate tightly in the axial direction against the crankshaft 84 or its connecting end. As a result, at least one off-center stud projection 340 of the connecting end is held in engagement in an opening 342 in the flexplate. The dimensions of the stud projection 340 in the plane orthogonal to the axis of rotation A and the dimensions of the opening 342 in this plane are coordinated in such a way that a rotationally driving connection, essentially without rotational play, is guaranteed between the flexplate 80 and the crankshaft 84.

It is quite possible, in the case of a "simple" flexplate such as the flexplate 80 of FIGS. 13 and 14, to provide a different type of central connection, namely, either by means of a different positive central connection or by a different form of nonpositive central connection, such as by means of driver formations, specifically sets of teeth, or by means of a combination of a central clamping or tensioning cone and an associated clamping or tensioning hole.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A motor vehicle drive train comprising
   a power takeoff shaft having a connecting end,
   a transmission having at least one transmission input shaft which occupies a radial area, a clutch device having an axis or rotation and comprising at least one clutch arrangement connected to a respective at least one input shaft, a torque-transmitting arrangement having a radially outer area connected to said clutch device and a radially inner area axially fixed to one of said connecting end and a component attached nonrotatably to said connecting end by at least one positive connecting element, said at least one positive connecting element being located in a central radial area relative to the axis of rotation, said central radial area being essentially the same or smaller than the radial area occupied by said at least one input shaft, wherein said torque transmitting arrangement is elastically resilient in the axial direction and elastically resilient to compensate for wobbling of the connecting end relative to the axis of rotation, and wherein said torque-transmitting arrangement and said clutch device form a vibration system having a resonance frequency with respect to axial vibrations and wobbling in the drive train, said resonance frequency being below a vibration excitation frequency corresponding to the no-load rotational speed.

2. A drive train as in claim 1 wherein said transmission comprises a first transmission input shaft and a second transmission input shaft which is coaxially inside of said first input shaft, and said clutch device comprises a first clutch arrangement connected to said first input shaft and a second clutch arrangement connected to said second input shaft.

3. A drive train as in claim 2 wherein said central radial area is the area occupied by said second input shaft.

4. A drive train as in claim 2 wherein each said clutch arrangement comprises at least one clutch disk mounted to a connecting hub, said connecting hub having a central receiving opening for connecting to the associated transmission input shaft, said central receiving openings forming a central channel through which said at least one positive connecting element is accessible before said transmission is assembled to said clutch device.

5. A drive train as in claim 1 wherein each said clutch arrangement comprises at least one clutch disk mounted to a connecting hub, said connecting hub having a central receiving opening for connecting to the associated transmission input shaft, said central receiving opening forming a central channel through which said positive connecting element is accessible before said transmission is assembled to said clutch device.

6. A drive train as in claim 5 further comprising an actuating module for actuating said at least one clutch arrangement, said actuating module being connected to the clutch device to form a structural unit, said actuating module having a central opening for receiving said input shafts therethrough and forming part of said central channel.

7. A drive train as in claim 1 wherein said at least one positive connecting element comprises a positive connecting element located precisely on said axis of rotation.

8. A drive train as in claim 1 wherein said connecting end and said radially inner area of said torque transmitting arrangement have cooperating rotational drive formations, said at least one positive connecting element holding said drive formations in driving engagement to secure said radially inner connecting area against rotation with respect to said one of said connecting end and a component attached nonrotatably to said connecting end.

9. A drive train as in claim 8 wherein said rotational drive formations comprise at least one of serrations and clearance-free SAE teeth.

10. A drive train as in claim 8 wherein said rotational drive formations comprise one of mortise and tenon combinations and peg-and-hole combinations.

11. A drive train as in claim 8 wherein said at least one positive connecting element holds said rotational drive formations in mutual, non-positive, rotationally driving engagement.

12. A drive train as in claim 11 wherein said rotational drive areas comprise essentially rotationally symmetric contact surfaces.

13. A drive train as in claim 12 wherein said contact surfaces comprise one of circumferential surfaces and a cone-conical hole combination.

14. A motor vehicle drive train comprising a power takeoff shaft having a connecting end, a transmission having at least one transmission input shaft which occupies a radial area, a clutch device having an axis or rotation and comprising at least one clutch arrangement connected to a respective at least one input shaft, and a torque-transmitting arrangement having a radially outer area connected to said clutch device and a radially inner area axially fixed to one of said connecting end and a component attached nonrotatably to said connecting end by at least one positive connecting element, said at least one positive connecting element being located in a central radial area relative to the axis of rotation, said central radial area being essentially the same or smaller than the radial area occupied by said at least one input shaft, wherein said torque transmitting arrangement is elastically resilient in the axial direction and elastically resilient to compensate for wobbling of the connecting end relative to the axis of rotation, wherein said torque-transmitting arrangement comprises a deformation area between said radially outer area and said radially inner area, said deformation area having elastic resilience in the axial direction and elastic resilience for wobbling of the inner and outer areas with respect to each other, and wherein said radially outer connecting area comprises a ring-shaped part, said radially inner area comprises a central part, and said deformation area comprises a plurality of connecting parts which connect the ring-shaped part to the central part.

15. A drive train as in claim 14 wherein said transmission comprises a first transmission input shaft and a second transmission input shaft which is coaxially inside of said first input shaft, and said clutch device comprises a first clutch arrangement connected to said first input shaft and a second clutch arrangement connected to said second input shaft.

16. A drive train as in claim 15 wherein said central radial area is the area occupied by said second input shaft.

17. A drive train as in claim 15 wherein each said clutch arrangement comprises at least one clutch disk mounted to a connecting hub, said connecting hub having a central receiving opening for connecting to the associated transmission input shaft, said central receiving openings forming a central channel through which said at least one positive connecting element is accessible before said transmission is assembled to said clutch device.

18. A drive train as in claim 14 wherein each said clutch arrangement comprises at least one clutch disk mounted to a connecting hub, said connecting hub having a central receiving opening for connecting to the associated transmission input shaft, said central receiving opening forming a central channel through which said positive connecting element is accessible before said transmission is assembled to said clutch device.

19. A drive train as in claim 18 further comprising an actuating module for actuating said at least one clutch arrangement, said actuating module being connected to the clutch device to form a structural unit, said actuating module having a central opening for receiving said input shafts therethrough and forming part of said central channel.

20. A drive train as in claim 14 wherein said at least one positive connecting element comprises a positive connecting element located precisely on said axis of rotation.

21. A drive train as in claim 14 wherein said connecting end and said radially inner area of said torque transmitting arrangement have cooperating rotational drive formations, said at least one positive connecting element holding said drive formations in driving engagement to secure said radially inner connecting area against rotation with respect to said one of said connecting end and a component attached nonrotatably to said connecting end.

22. A drive train as in claim 21 wherein said rotational drive formations comprise at least one of serrations and clearance-free SAE teeth.

23. A drive train as in claim 21 wherein said rotational drive formations comprise one of mortise and tenon combinations and peg-and-hole combinations.

24. A drive train as in claim 21 wherein said at least one positive connecting element holds said rotational drive formations in mutual, non-positive, rotationally driving engagement.

25. A drive train as in claim 24 wherein said rotational drive areas comprise essentially rotationally symmetric contact surfaces.

26. A drive train as in claim 25 wherein said contact surfaces comprise one of circumferential surfaces and a cone-conical hole combination.

27. A drive train as in claim 14 wherein said ring-shaped part, said central part, and said connecting parts are produced separately and joined together.

28. A drive train as in claim 27 wherein said ring-shaped part, and said central part are formed of metal plate.

29. A drive train as in claim 27 wherein said connecting parts are formed as strips extending in the circumferential direction.

30. A drive train as in claim 27 wherein said connecting strips are formed from one of metal sheet and plate, said connecting strips acting as leaf springs.

31. A drive train as in claim 27 wherein each said connecting part comprises a middle area and two opposed ends, said middle area being joined to the central part, said ends being joined to the ring-shaped part.

32. A drive train as in claim 31 wherein said connecting parts overlap axially, the middle area of each said connecting part lying axially over one said end of each of two other said connecting parts.

33. A motor vehicle drive train comprising
a power takeoff shaft having a connecting end,
a transmission having at least one transmission input shaft which occupies a radial area,
a clutch device having an axis or rotation and comprising at least one clutch arrangement connected to a respective at least one input shaft,
a torque-transmitting arrangement having a radially outer area connected to said clutch device and a radially inner area axially fixed to one of said connecting end and a component attached nonrotatably to said connecting end by at least one positive connecting element, said at least one positive connecting element being located in a central radial area relative to the axis of rotation, said central radial area being essentially the same or smaller than the radial area occupied by said at least one input shaft,
wherein said torque transmitting arrangement is elastically resilient in the axial direction and elastically resilient to compensate for wobbling of the connecting end relative to the axis of rotation,
wherein said torque-transmitting arrangement comprises a deformation area between said radially outer area and said radially inner area, said deformation area having elastic resilience in the axial direction and elastic resilience for wobbling of the inner and outer areas with respect to each other,
wherein said torque-transmitting arrangement comprises a damping element arrangement, and
wherein said damping element arrangement comprises a plurality of viscoelastic strips.

34. A drive train as in claim 33 wherein
said transmission comprises a first transmission input shaft and a second transmission input shaft which is coaxially inside of said first input shaft, and
said clutch device comprises a first clutch arrangement connected to said first input shaft and a second clutch arrangement connected to said second input shaft.

35. A drive train as in claim 34 wherein said central radial area is the area occupied by said second input shaft.

36. A drive train as in claim 34 wherein each said clutch arrangement comprises at least one clutch disk mounted to a connecting hub, said connecting hub having a central receiving opening for connecting to the associated transmission input shaft, said central receiving openings forming a central channel through which said at least one positive connecting element is accessible before said transmission is assembled to said clutch device.

37. A drive train as in claim 33 wherein each said clutch arrangement comprises at least one clutch disk mounted to a connecting hub, said connecting hub having a central receiving opening for connecting to the associated transmission input shaft, said central receiving opening forming a central channel through which said positive connecting element is accessible before said transmission is assembled to said clutch device.

38. A drive train as in claim 37 further comprising an actuating module for actuating said at least one clutch arrangement, said actuating module being connected to the clutch device to form a structural unit, said actuating module having a central opening for receiving said input shafts therethrough and forming part of said central channel.

39. A drive train as in claim 33 wherein said at least one positive connecting element comprises a positive connecting element located precisely on said axis of rotation.

40. A drive train as in claim 33 wherein said connecting end and said radially inner area of said torque transmitting arrangement have cooperating rotational drive formations, said at least one positive connecting element holding said drive formations in driving engagement to secure said radially inner connecting area against rotation with respect to said one of said connecting end and a component attached nonrotatably to said connecting end.

41. A drive train as in claim 40 wherein said rotational drive formations comprise at least one of serrations and clearance-free SAE teeth.

42. A drive train as in claim 40 wherein said rotational drive formations comprise one of mortise and tenon combinations and peg-and-hole combinations.

43. A drive train as in claim 40 wherein said at least one positive connecting element holds said rotational drive formations in mutual, non-positive, rotationally driving engagement.

44. A drive train as in claim 43 wherein said rotational drive areas comprise essentially rotationally symmetric contact surfaces.

45. A drive train as in claim 44 wherein said contact surfaces comprise one of circumferential surfaces and a cone-conical hole combination.

46. A drive train as in claim 33 wherein said damping element arrangement is installed between the radially outer connecting area and the radially inner connecting area parallel to the deformation area.

47. A drive train as in claim 46 wherein said damping element arrangement is installed between the deformation area and at least one of the radially outer area and the radially inner area.

* * * * *